United States Patent
Guo et al.

(10) Patent No.: US 11,310,014 B2
(45) Date of Patent: Apr. 19, 2022

(54) METHOD AND DEVICE FOR INFORMATION INDICATION AND RESOURCE DETERMINATION AND COMPUTER STORAGE MEDIUM

(71) Applicant: China Academy of Telecommunications Technology, Beijing (CN)

(72) Inventors: Baojuan Guo, Beijing (CN); Tamrakar Rakesh, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 43 days.

(21) Appl. No.: 16/764,851

(22) PCT Filed: Oct. 19, 2018

(86) PCT No.: PCT/CN2018/111071
§ 371 (c)(1),
(2) Date: May 16, 2020

(87) PCT Pub. No.: WO2019/095931
PCT Pub. Date: May 23, 2019

(65) Prior Publication Data
US 2020/0344020 A1     Oct. 29, 2020

(30) Foreign Application Priority Data
Nov. 17, 2017  (CN) .......................... 201711148798.4

(51) Int. Cl.
*H04L 5/00* (2006.01)
*H04L 27/26* (2006.01)

(52) U.S. Cl.
CPC .......... *H04L 5/0048* (2013.01); *H04L 27/261* (2013.01)

(58) Field of Classification Search
CPC ... H04B 7/0452; H04L 5/0048; H04L 27/261; H04L 27/262
See application file for complete search history.

(56) References Cited

U.S. PATENT DOCUMENTS

2011/0237283 A1   9/2011  Shan et al.
2018/0278395 A1*  9/2018  Yoon .................. H04L 27/2613
(Continued)

FOREIGN PATENT DOCUMENTS

CN    101707511 A    5/2010
CN    102122984 A    7/2011
(Continued)

OTHER PUBLICATIONS

Panasonic, "On remaining details of NR DL DMRS",3GPP TSG RAN WG1 Meeting 90bis, Prague, Czech Republic, Oct. 9-13, 2017, total 10 pages, R1-1718367.
(Continued)

*Primary Examiner* — David B Lugo
(74) *Attorney, Agent, or Firm* — Kilpatrick Townsend & Stockton, LLP

(57) ABSTRACT

Disclosed are a method and a device for information indication and resource determination, and a computer storage medium, which are used to indicate and determine the resource occupation state of a DMRS port, and to save a signaling overhead. The information indication method provided in an embodiment of the present application comprises: determining indication information on a demodulation reference signal (DMRS) port resource that a terminal needs to occupy, according to a preset configuration list, wherein the configuration list comprises DMRS group information and DMRS port information; and notifying the terminal of the indication information.

18 Claims, 8 Drawing Sheets

(56) References Cited

U.S. PATENT DOCUMENTS

| | | | | |
|---|---|---|---|---|
| 2019/0068308 A1* | 2/2019 | Shin | ............... | H04J 13/0003 |
| 2019/0342062 A1* | 11/2019 | Ren | ..................... | H04L 5/10 |
| 2020/0235901 A1* | 7/2020 | Dou | ................... | H04B 7/024 |

FOREIGN PATENT DOCUMENTS

| | | | |
|---|---|---|---|
| CN | 102158302 | A | 8/2011 |
| CN | 102300313 | A | 12/2011 |
| CN | 102447524 | A | 5/2012 |
| CN | 102754364 | A | 10/2012 |
| CN | 106160970 | A | 11/2016 |
| CN | 106162890 | A | 11/2016 |
| CN | 106470087 | A | 3/2017 |
| CN | 106470088 | A | 3/2017 |
| CN | 106856426 | A | 6/2017 |
| EP | 3664346 | A1 | 6/2020 |

OTHER PUBLICATIONS

Huawei et al., "Signaling of DMRS ports for SU/MU-MIMO", 3GPP TSG RAN WG1 NRAd-Hoc#3, Nagoya, Japan, Sep. 18-21, 2017, total 14 pages, R1-1715599.

Huawei et al., "Signaling of DMRS ports for SU/MU-MIMO", 3GPP TSG RAN WG1 Meeting #90bis, Prague, Czech Republic, Oct. 9-13, 2017, total 15 pages, R1-1717310.

Samsung, "Remaining details on DMRS", 3GPP TSG RAN WG1 Meeting 90bis, Prague, CZ, Oct. 9-13, 2017, total 10 pages, R1-1717630.

* cited by examiner

US 11,310,014 B2

METHOD AND DEVICE FOR INFORMATION INDICATION AND RESOURCE DETERMINATION AND COMPUTER STORAGE MEDIUM

CROSS REFERENCE

This application is a National Stage of International Application No. PCT/CN2018/111071, filed Oct. 19, 2018, which claims the priority of Chinese Patent Application No. 201711148798.4 filed with the Chinese Patent Office on Nov. 17, 2017, and entitled "METHOD AND DEVICE FOR INFORMATION INDICATION AND RESOURCE DETERMINATION AND COMPUTER STORAGE MEDIUM". The entire content of the disclosure is incorporated herein by reference.

FIELD

The present disclosure relates to the field of communications, and particularly to a method and device for information indication, a method and device for resource determination, and a computer storage medium.

BACKGROUND

In the 5 generation (hereinafter "5G") new radio (hereinafter "NR"), orthogonality between antenna ports may be realized with frequency division multiplexing (hereinafter "FDM") or orthogonal cover code (hereinafter "OCC") to support multi-user multiple-input multiple output (hereinafter "MU-MIMO") transmission. Resource elements (hereinafter "REs") for user data allocation shall be determined according to REs designated to demodulation reference signals (hereinafter "DMRS"). That is, REs not designated to the DMRS may be used for transmitting user data. In the case of single-user transmission, the user equipment (hereinafter "UE") may perform rate matching of data directly as it knows the REs designated to its DMRS port(s). In contrast, for the multiple UEs of MU-MIMO transmission to perform rate matching of their data, each UE should know not only the REs designated to its DMRS port(s) but also the REs designated to other UEs' DMRS ports, in which case the UEs must support nontransparent MU-MIMO. However, there is no existing solution for indicating the REs designated to the DMRS ports of the UEs of MU-MIMO transmission.

SUMMARY

The embodiment of the disclosure provides a method and device for information indication, a method and device for resource determination, and a computer storage medium, to indicate and determine the REs designated to the DMRS ports and to reduce the amount of overhead.

An embodiment of the disclosure provides a method for information indication. The method includes: determining indication information of one or more DMRS ports resources to be occupied by a terminal according to a preset configuration table, where the configuration table includes DMRS group information and DMRS port information; and transmitting the indication information to the terminal.

With the method for information indication, the indication information of the one or more DMRS ports resources to be occupied by the terminal is determined according to the preset configuration table, which includes the DMRS group information and the DMRS port information, and the indication information is transmitted to the terminal. In one embodiment, an indication of the occupancy of DMRS ports resources can be achieved, and the terminal can determine the DMRS port resources that need to be occupied. Moreover, since the configuration table includes the DMRS group information and the DMRS port information, comparing with transmitting the DMRS group information and the DMRS port information separately, the method may reduce signaling overhead.

In one embodiment, the DMRS group information includes DMRS group indexes and the number of DMRS symbols.

In one embodiment, the DMRS port information includes DMRS port indexes.

In one embodiment, the configuration table further includes configuration indexes.

In one embodiment, the indication information includes the configuration indexes.

In one embodiment, the configuration table further includes quantities of DMRS configuration layers.

In one embodiment, a DMRS ports designation principle of the configuration table includes: when designating one or more DMRS ports resources to the terminal, setting indexes of respective DMRS ports and respective DMRS groups, respectively, to numbers starting from 0 in an order from least to greatest, and if an index of a DMRS group including one of the one or more DMRS ports to be occupied by the terminal is greater than 0, then determining that any DMRS group having an index smaller than the index of the DMRS group including the DMRS port designated to the terminal is to be occupied by the terminal.

In one embodiment, when a DMRS includes one orthogonal frequency OFDM symbol, the maximum number of supported ports is N1, when a DMRS includes two OFDM symbols, the maximum number of supported ports is N2, and the indexes of the respective DMRS ports and the respective DMRS groups are set to the numbers starting from 0 in the order from the least to the greatest, respectively, then the configuration table includes one or a combination of following cases.

Case 1: when one index of indexes of DMRS ports designated to the terminal is greater than N1−1, then the total number of DMRS ports configured for MU-MIMO transmission is greater than N1, and a DMRS includes two OFDM symbols; and according to the DMRS ports designation principle, DMRS ports belonging to a same DMRS group are designated first, where DMRS group indexes of the DMRS group include at least 0 and 1.

Case 2: when the number of the DMRS ports designated to the terminal is greater than two and no index of the designated DMRS ports is greater than N1−1, then the total number of DMRS ports configured for the MU-MIMO transmission is smaller than or equal to N1 and the DMRS includes one OFDM symbol; and according to the DMRS ports designation principle, DMRS ports belonging to a same DMRS group are designated first, where DMRS groups indexes of the DMRS group include at least 0 and 1.

In one embodiment, the configuration table includes five columns, where a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and a fifth column indicates the number of allocated DMRS symbols.

In one embodiment, the configuration table includes four columns, where a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and different DMRS group indexes correspond to different numbers of DMRS symbols.

In one embodiment, the method further includes: transmitting indication information of a DMRS pilot pattern corresponding to the preset configuration table to the terminal.

The embodiment of the disclosure further provides a method for resource determination. The method includes: receiving indication information of one or more DMRS ports resources to be occupied by a terminal from a network side device; and determining the one or more DMRS ports resources to be occupied by the terminal according to a preset configuration table and the indication information, where the configuration table includes DMRS group information and DMRS port information.

In one embodiment, the method further includes: receiving indication information of a DMRS pilot pattern; and determining the preset configuration table corresponding to the indication information of the DMRS pilot pattern.

The embodiment of the disclosure further provides a device for information indication. The device includes a memory and a processor.

The memory is configured to store program instructions.

The processor is configured to read the program instructions to perform operations of: determining indication information of one or more DMRS ports resources to be occupied by a terminal according to a preset configuration table, where the configuration table includes DMRS group information and DMRS port information; and transmitting the indication information to the terminal via the transceiver.

In one embodiment, the DMRS group information includes DMRS group indexes and the number of DMRS symbols.

In one embodiment, the DMRS port information includes DMRS port indexes.

In one embodiment, the configuration table further includes configuration indexes.

In one embodiment, the indication information includes the configuration indexes.

In one embodiment, the configuration table further includes quantities of DMRS configuration layers.

In one embodiment, a DMRS ports designation principle of the configuration table includes: when designating one or more DMRS ports resources to the terminal, setting indexes of respective DMRS ports and respective DMRS groups, respectively, to numbers starting from 0 in an order from least to greatest, and when an index of a DMRS group including one of the one or more DMRS ports to be occupied by the terminal is greater than 0, then determining that any DMRS group having an index smaller than the index of the DMRS group including the DMRS port designated to the terminal is to be occupied by the terminal.

In one embodiment, when a DMRS includes one OFDM symbol, the maximum number of supported ports is N1, when a DMRS includes two OFDM symbols, the maximum number of supported ports is N2, and the indexes of the respective DMRS ports and the respective DMRS groups are set to the numbers starting from 0 in the order from the least to the greatest, respectively, then the configuration table includes one or a combination of following cases.

Case 1: when one index of indexes of DMRS ports designated to the terminal is greater than N1−1, then the total number of DMRS ports configured for the MU-MIMO transmission is greater than N1, and a DMRS includes two OFDM symbols; and according to the DMRS ports designation principle, DMRS ports belonging to a same DMRS group are designated first, where DMRS group indexes of the DMRS group include at least 0 and 1.

Case 2: when the number of the DMRS ports designated to the terminal is greater than two and no index of the designated DMRS ports is greater than N1−1, then the total number of DMRS ports configured for the MU-MIMO transmission is smaller than or equal to N1 and the DMRS includes one OFDM symbol; and according to the DMRS ports designation principle, DMRS ports belonging to a same DMRS group are designated first, where DMRS groups indexes of the DMRS group includes at least 0 and 1.

In one embodiment, the configuration table includes five columns, where a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and a fifth column indicates the number of allocated DMRS symbols.

In one embodiment, the configuration table includes four columns, where a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and different DMRS group indexes correspond to different numbers of DMRS symbols.

In one embodiment, the processor is further configured to read the program instructions to perform an operation of: transmitting indication information of a DMRS pilot pattern corresponding to the preset configuration table to the terminal.

The embodiment of the disclosure further provides a device for resource determination. The device includes a memory and a processor.

The memory is configured to store program instructions.

The processor is configured to read the program instructions to perform operations of: receiving indication information of one or more DMRS ports resources to be occupied by a terminal from a network side device; and determining the one or more DMRS ports resources to be occupied by the terminal according to a preset configuration table and the indication information, where the configuration table includes DMRS group information and DMRS port information.

In one embodiment, the processor is further configured to read the program instructions to perform an operation of: receiving indication information of a DMRS pilot pattern;

and determining the preset configuration table corresponding to the indication information of the DMRS pilot pattern.

The embodiment of the disclosure further provides another device for information indication. The device includes a determining device and an indicating device.

The determining device is configured to determine indication information of one or more DMRS ports resources to be occupied by a terminal according to a preset configuration table, where the configuration table includes DMRS group information and DMRS port information.

The indicating device is configured to transmit the indication information to the terminal.

The embodiment of the disclosure further provides another device for resource determination. The device includes a receiving device and a determining device.

The receiving device is configured to receive indication information of one or more DMRS ports resources to be occupied by a terminal from a network side device.

The determining device is configured to determine the one or more DMRS ports resources to be occupied by the terminal according to a preset configuration table and the indication information, where the configuration table includes DMRS group information and DMRS port information.

The embodiment of the disclosure further provides a computer storage medium. The computer storage medium stores computer executable instructions, and when the computer executable instructions are executed by a computer, the computer performs any one of the methods above.

BRIEF DESCRIPTION OF THE DRAWINGS

The embodiment of the disclosure illustrates the embodiments of the disclosure which are briefly introduced below. Apparently, the drawings introduced below illustrate only a part of implementations of the embodiment of the disclosure.

DETAILED DESCRIPTION OF THE EMBODIMENTS

The embodiments of the disclosure can be applicable to various communication systems, e.g., a global system of mobile communication (hereinafter "GSM") system, a code division multiple access (hereinafter "CDMA") system, a wideband code division multiple access (hereinafter "WCDMA") system, a general packet radio service (hereinafter "GPRS") system, a long term evolution (hereinafter "LTE") system, an advanced long term evolution (hereinafter "LTE-A") system, a universal mobile telecommunication system (hereinafter "UMTS"), an NR system, and etc.

It shall be further appreciated that according to the embodiments of the disclosure, user equipment (hereinafter "UE") includes but is not be limited to a mobile station (hereinafter "MS"), a mobile terminal, a mobile telephone, a handset, portable equipment, and etc. The UE can communicate with one or more core networks via a radio access network (hereinafter "RAN"). For example, the user equipment can be a mobile phone (or a cell phone) or a computer having a function of radio communication, or the user equipment can be a portable, pocket, handheld, built-in-computer, or on-vehicle mobile apparatus.

According to the embodiments of the disclosure, a base station (e.g., an access point) can be an apparatus in an access network that communicates with a radio terminal over one or more sectors via an air interface. The base station can be configured to convert a received air frame into an internet protocol (hereinafter "IP") packet and a received IP packet into an air frame, and operate as a router between the radio terminal and the remaining components of the access network, where the remaining components of the access network can include an IP network. The base station can further coordinate attribute management of the air interface. For example, the base station can be a base transceiver station (hereinafter "BTS") in a GSM or CDMA system, a NodeB in a TD-SCDMA or a WCDMA system, an evolutional Node B (or referred to as eNodeB, eNB or e-Node B) in an LTE system, or a base station (hereinafter "gNB") in a 5G NR system, although the disclosure is not limited thereto.

The embodiment of the disclosure provides a method and device for information indication, a method and device for resource determination, and a computer storage medium, to indicate and determine the REs designated to the DMRS ports and to reduce the amount of signaling overhead.

Figure 1:
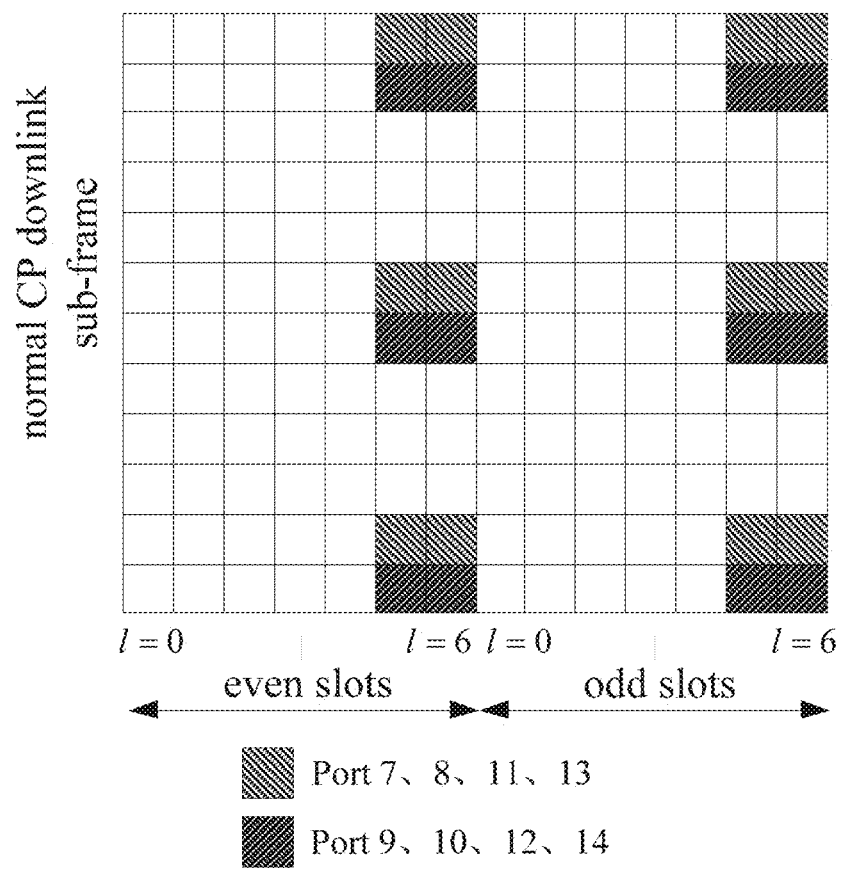
FIG. 1 is a schematic diagram of DMRS resources in a normal cyclic prefix (hereinafter "CP") downlink sub-frame according to an embodiment of the disclosure.

In an LTE system, an UE may perform channel estimation according to a UE-specific DMRS. The DMRS and user data go through a same precoding process. LTE (Rel-10 or higher) supports 8 DMRS ports (hereinafter "ports") orthogonalized through OCC or FDM, i.e., ports 7 to 14 illustrated in FIG. 1, where ports 7, 8, 11 and 13 multiplex the same REs of a group of subcarriers and are distinguished using OCC, and ports 9, 10, 12 and 14 multiplex the same REs of another group of subcarriers and are also distinguished using OCC.

To realize transparent transmission and to reduce the number of time/frequency REs occupied by the overhead of DMRS, the MU-MIMO transmission mode in LTE Rel-10 only uses ports 7 and 8, in other words only two DMRS ports maintain orthogonality with OCC. DMRS allocated to different data streams and transmitted on a same port are quasi-orthogonal to differentiate from each other using a precoding/beamforming matrix same to the one of data channel but different DMRS scrambling sequences. When only ports 7 and 8 are used for transmitting DMRS, the length of OCC is 2.

As illustrated in Table 1 below, downlink control information (hereinafter "DCI") includes an indication for both DMRS port(s) allocated for a UE and a scrambling identity (hereinafter "nSCID") describing a DMRS scrambling sequence.

TABLE 1

Antenna port(s) (i.e. DMRS port(s)), scrambling identity and indication of the number of data stream (i.e. the number of layers) in LTE Rel-10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In the discussion of full dimension-MIMO (hereinafter "FD-MIMO") as an early technology of massive array antenna in the 3rd generation partnership project (hereinafter "3GPP") standards, the number of orthogonal DMRS are increased to support more UEs, e.g., ports 7, 8, 11 and 13 are used for DMRS transmission and the length of OCC is 4.

In the LTE, the increase of the number of orthogonal DMRS ports would not change a corresponding DMRS pilot pattern. As long as a UE knows the ports allocated to itself, it may perform information detection and demodulation according to the DMRS pilot pattern.

The 5G NR project re-designs and re-defines the DMRS pilot pattern to minimize processing delay and improve system performance. There are various new DMRS pilot patterns.

Configuration 1.

When the number of DMRS symbols is 1, combination (hereinafter "comb") 2+cyclic shifts (hereinafter "CS") 2 is adopted and up to 4 ports are supported.

Figure 2:
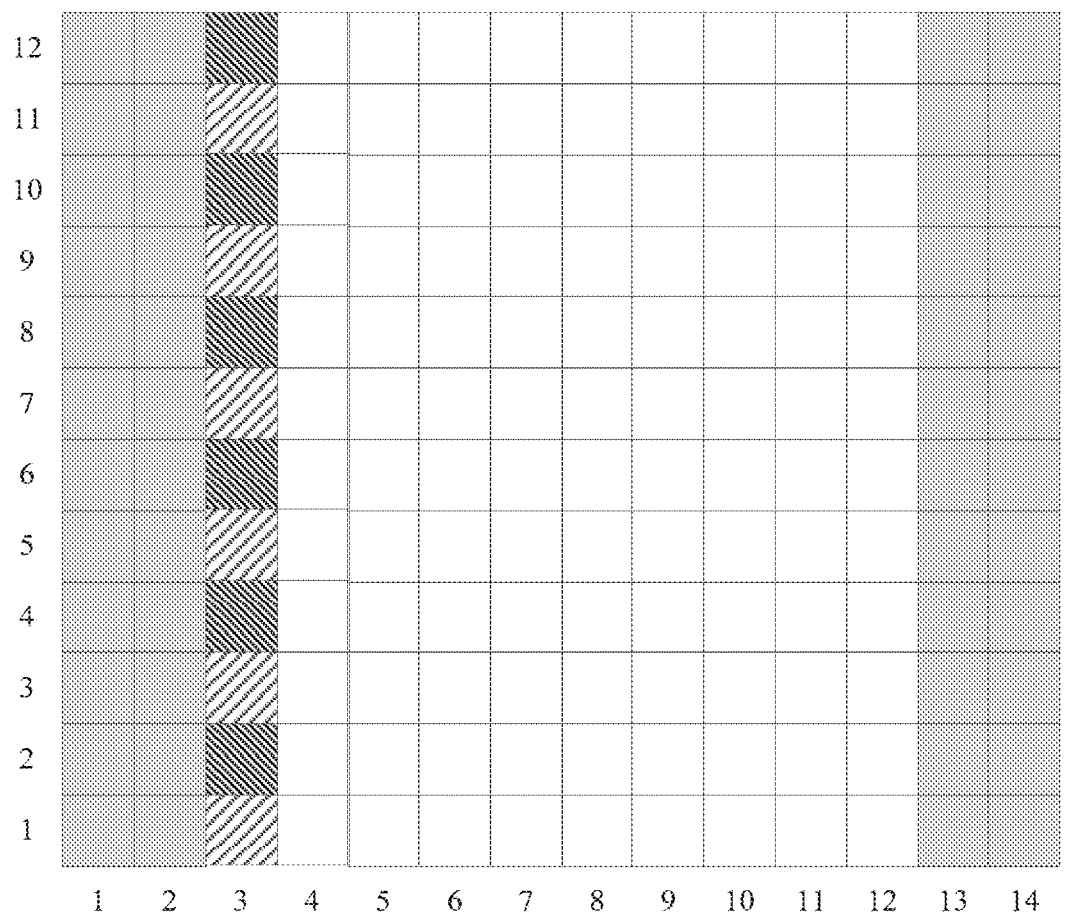
FIG. 2 is a schematic diagram of a first DMRS pilot pattern according to the embodiment of the disclosure.

As illustrated by FIG. 2, comb2 is FDM, e.g., the multiplexing relationship between ports 0 and 2 is comb2. CS2 refers to cyclically shifting sequences transmitted on the ports, e.g., the multiplexing relationship between ports 0 and 1 is CS2.

When the number of DMRS symbols is 2, comb2+CS2+TD-OCC ({1, 1} and {1, −1}) is adopted and up to 8 ports are supported. TD-OCC ({1, 1} and {1, −1}) refer to TD-OCC multiplexing of two ports, where {1, 1} and {1, −1} are multiplexing coefficients of the two ports, respectively.

Figure 3:
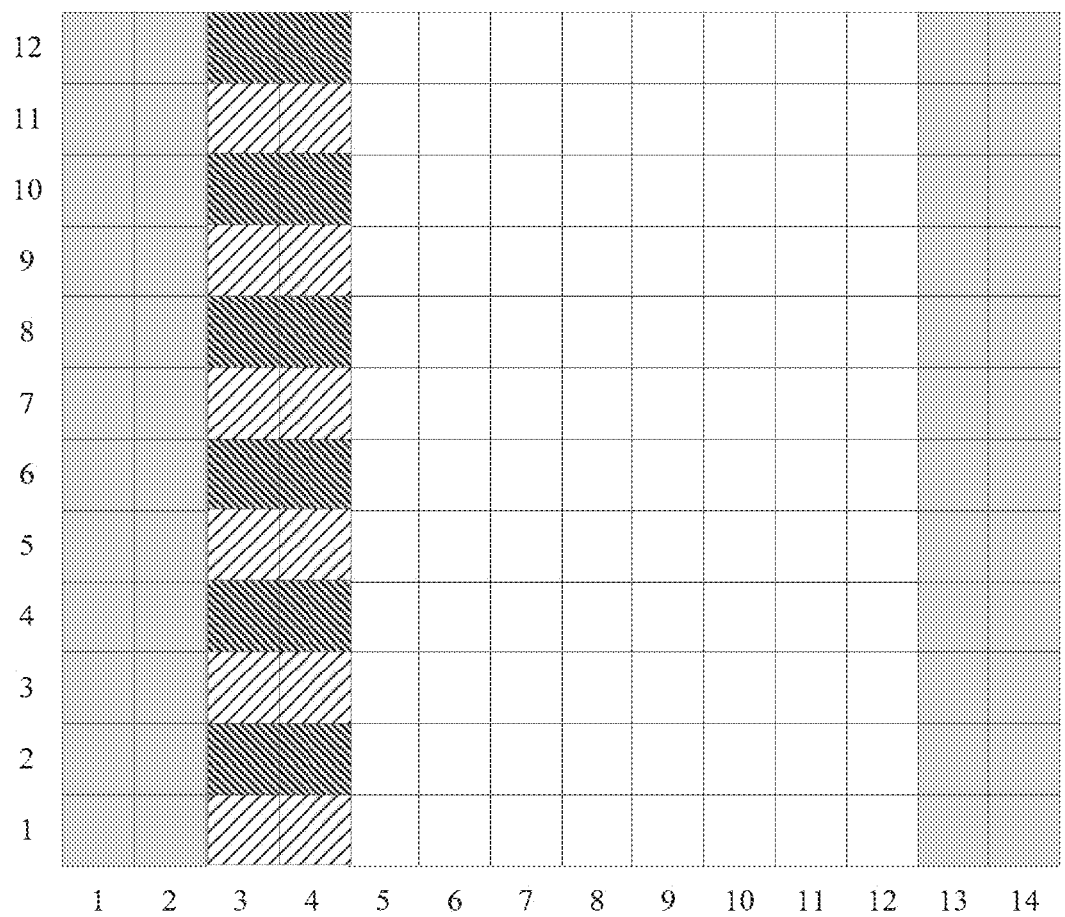
FIG. 3 is a schematic diagram of a second DMRS pilot pattern according to the embodiment of the disclosure.

As illustrated by FIG. 3, TD-OCC stands for time-domain orthogonal cover code. For example, ports 0/1 and 4/5 are multiplexed with TD-OCC, where ports 0 and 1 are multiplexed with CS2, and ports 4 and 5 are also multiplexed with CS2.

Configuration 2.

When the number of DMRS symbols is 1, 2-frequency-domain-OCC (hereinafter "FD-OCC") across adjacent REs in the frequency domain are adopted and up to 6 ports are supported.

Figure 4:
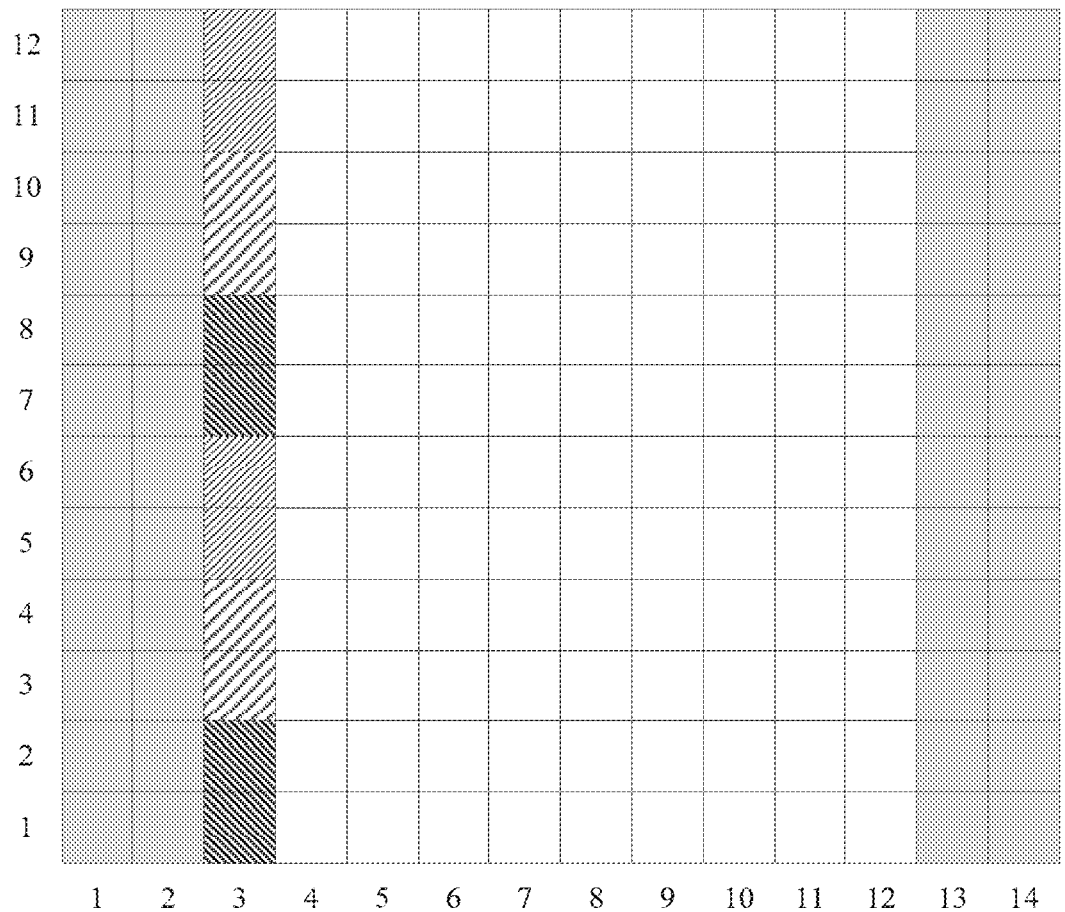
FIG. 4 is a schematic diagram of a third DMRS pilot pattern according to the embodiment of the disclosure.

As illustrated by FIG. 4, 2-FD-OCC is frequency-domain OCC multiplexing. E.g., the ports 0 and 1 are multiplexed in the frequency with OCC. The port 0 or 1 is multiplexed with another port by FDM. E.g., the ports 0/1 and 2/3 maintain orthogonality with FDM.

When the number of DMRS symbols is 2, 2-FD-OCC across adjacent REs in the frequency domain+TD-OCC ({1, 1} and {1, −1}) are adopted and up to 12 ports are supported.

Figure 5:
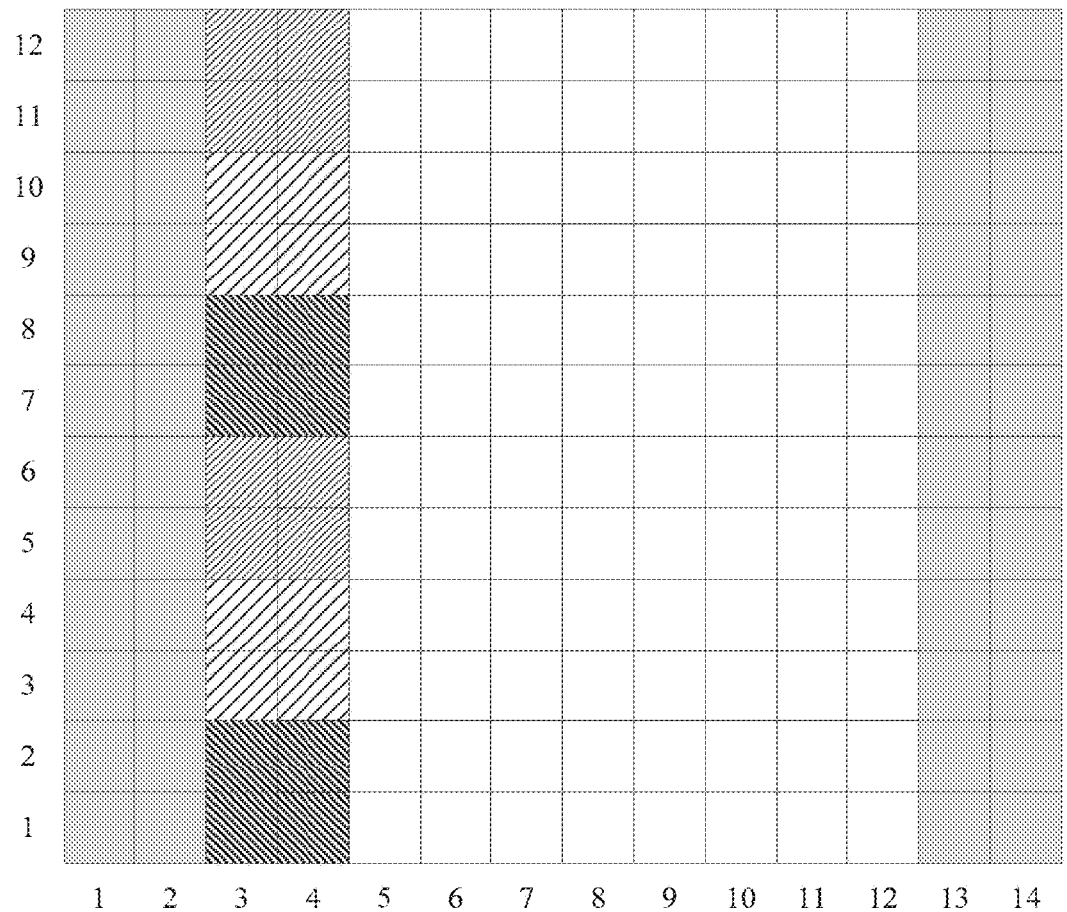
FIG. 5 is a schematic diagram of a fourth DMRS pilot pattern according to the embodiment of the disclosure.

As illustrated by FIG. 5, TD-OCC stands for time-domain orthogonal cover code. For example, ports 0/1 and 6/7 are multiplexed with TD-OCC.

It can be seen from the various pilot patterns that when the configuration 1 is selected, the pattern illustrated by FIG. 2 may be used for configuration when the maximum number of supported ports is smaller than or equal to 4, or the pattern illustrated by FIG. 3 may be used when the maximum number of supported ports is greater than 4 but smaller than or equal to 8. When the configuration 2 is selected, the pattern illustrated by FIG. 4 may be used when the maximum number of supported ports is smaller than or equal to 6, or the pattern illustrated by FIG. 5 may be used when the maximum number of supported ports is greater than 6 but smaller than or equal to 12. The number of supported ports here refers to the number of ports of all terminals multiplexed at a same RE position.

In addition, in FIGS. 2 to 5, the first two columns represent a control symbol field, i.e., the symbols occupied by downlink control channel, whereas the last two columns may be the symbols occupied by uplink control channel, i.e., the symbols that cannot be occupied by physical downlink shared channel (hereinafter "PDSCH").

In the NR system, DCI includes information about multiple antennas such as antenna ports, scrambling ID and the number of layers. The information about multiple antennas also needs to include information required for DMRS configuration.

As such, in the 5G NR, orthogonality between antenna ports may be realized with FDM or OCC etc., to support MU-MIMO transmission. REs for user data allocation shall be determined according to REs designated to DMRS. That is, REs not designated to the DMRS may be used for transmitting user data. In the case of single-user transmission, the UE may perform rate matching of data directly as it knows the REs designated to its DMRS port(s). In contrast, for the multiple UEs of MU-MIMO transmission to perform rate matching of their data, each UE should know not only the REs designated to its DMRS port(s) but also the REs designated to other UEs' DMRS ports, in which case the UEs must support nontransparent MU-MIMO. Therefore, the UEs of MU-MIMO transmission should be indicated the REs designated to their DMRS ports. The word "user" herein may be understood as a terminal.

Take the DMRS pattern illustrated by FIG. 5 as an example. When the number of DMRS symbols is 1, the ports 0 and 1 are multiplexed using code division multiplexing (hereinafter "CDM"), and ports 2 and 3, and the ports 0/1 and 2/3 are separated from each other using FDM. As defined by the standards, a DMRS group consists of ports of a same CDM group. Similarly, when the number of DMRS symbols is 2, a DMRS group consists of four ports of a same CDM group.

In a DMRS ports information indication, since the terminals need nontransparent MU-MIMO, not only information about ports designated to a terminal but also information about ports designated to all other terminals should be transmitted to each terminal for rate matching.

The information about REs designated to each MU-MIMOs user may be transmitted to the terminal in the form of DMRS group information. As the DMRS group information is not transmitted via signaling, the DMRS group information may be transmitted to the terminal together with a DMRS configuration table (e.g., the Table 3 below, which includes correspondence relationships of DMRS configuration indexes, the number of DMRS layers and port indexes). The DMRS group information includes information about ports included by each DMRS group, information about DMRS group index, and information about the DMRS symbol length.

Scheme 1.

The DMRS group according to the embodiment of the disclosure consists of DMRS ports multiplexed using CDM. In other words, as illustrated by Table 2, for one DMRS symbol, a DMRS group includes 2 ports, whereas for two DMRS symbols, a DMRS group includes 4 ports.

TABLE 2

| DMRS group index | Port index | |
|---|---|---|
| | The number of DMRS symbols = 1 | The number of DMRS symbols = 2 |
| 0 | port 0/1 | port 0/1/6/7 |
| 1 | port 2/3 | port 2/3/8/9 |
| 2 | port 4/5 | port 4/5/10/11 |

Further explanation, as illustrated by FIGS. 2-5, multiple DMRS ports illustrated by a same filling pattern (e.g. ports 0 and 1, or ports 2 and 3, in FIG. 2) are multiplexed using comb, CS or OCC, and such DMRS ports consist a CDM group or a DMRS group. DMRS ports illustrated by different filling patterns (e.g., ports 0/1 and 2/3 in FIG. 2) are multiplexed using FDM. Ports multiplexed using FDM belong to different CDM groups or DMRS groups. Each CDM group is defined as a DMRS group.

The number of ports included by a DMRS group changes as the number of DMRS symbols changes. Therefore, information about the DMRS symbol length needs to be added into the DMRS configuration table in addition to the DMRS group information. The maximum DMRS symbol length is configured via RRC signaling according to the standards, but the actual DMRS symbol length may be smaller than or equal to the maximum DMRS symbol length configured by the RRC signaling.

It is to be noted that the ports herein refer to DMRS ports or antenna ports.

As illustrated by Table 3, for the DMRS configuration table, 5-bit signaling is needed for indicating 32 different configurations of DMRS ports. As illustrated by Table 2, another 2-bit signaling is needed for indicating 3 different DMRS groups. Still another 1-bit signaling is needed for indicating the two different DMRS symbol lengths as illustrated by Table 2. Therefore, in total 8 bits are needed for the signaling.

TABLE 3

| Configuration index | The number of Layers | Port index |
|---|---|---|
| 0 | 1 layer, | port 0 |
| 1 | 1 layer, | port 1 |
| 2 | 1 layer, | port 2 |
| 3 | 1 layer, | port 3 |
| 4 | 1 layer, | port 4 |
| 5 | 1 layer, | port 5 |
| 6 | 1 layer, | port 6 |
| 7 | 1 layer, | port 7 |
| 8 | 1 layer, | port 8 |
| 9 | 1 layer, | port 9 |
| 10 | 1 layer, | port 10 |

TABLE 3-continued

| Configuration index | The number of Layers | Port index |
|---|---|---|
| 11 | 1 layer, | port 11 |
| 12 | 2 layers | ports 0-1 |
| 13 | 2 layers | ports 2-3 |
| 14 | 2 layers | ports 4-5 |
| 15 | 2 layers | ports 6-7 |
| 16 | 2 layers | ports 8-9 |
| 17 | 2 layers | ports 10-11 |
| 18 | 3 layers | ports 0-2 |
| 19 | 3 layers | ports 3-5 |
| 20 | 3 layers | ports 0-1, 6 |
| 21 | 3 layers | ports 2-3, 8 |
| 22 | 3 layers | ports 4-5, 10 |
| 23 | 4 layers | ports 0-3 |
| 24 | 4 layers | ports 0-1, 6-7 |
| 25 | 4 layers | ports 2-3, 8-9 |
| 26 | 4 layers | ports 4-5, 10-11 |
| 27 | 5 layers | ports 0-4 |
| 28 | 5 layers | ports 0-2, 6-7 |
| 29 | 6 layers | ports 0-3, 6-7 |
| 30 | 7 layers | ports 0-3, 6-8 |
| 31 | 8 layers | ports 0-3, 6-9 |

The number of layers in Table 3, i.e., the number of data streams transmitted at the same time, indicates the number of data streams transmitted in parallel.

To further reduce the signaling overhead, in the embodiments of the present application, the DMRS group indexes and the DMRS symbol length and ports (e.g., DMRS configuration indexes, the number of DMRS layers and port indexes) are indicated by a single configuration table as illustrated by Table 4.

The following principle is taken into account during configuration of the configuration table according to the embodiment of the disclosure.

When the network side device allocates ports to all the UEs, starting from port 0, if an allocated port belongs to a DMRS group with a high DMRS group index, DMRS groups with lower DMRS group indexes are also allocated. For example, if port 2, belonging to a DMRS group whose index is 1, is allocated to a UE, then the DMRS group includes at least DMRS groups with indexes 0 and 1 according to the configuration, i.e. DMRS group index 0 and DMRS group index 1 are allocated to all the MU-MIMO UEs.

As illustrated by Table 4, the first column indicates DMRS configuration indexes, the second column indicates the number of layers configured for a UE, the third column indicates an index of a DMRS port corresponding to the number of layers of the UE, the fourth column indicates DMRS group indexes of ports of all MU-MIMO UEs (e.g., group 0/1 means DMRS group indexes 0 and 1 are included), and the last column indicates the configured number of DMRS symbols.

It is to be noted that, in FIGS. 2-5, when a DMRS includes one OFDM symbol, the maximum number of supported ports is N1, and when a DMRS includes two OFDM symbols, the maximum number of supported ports is N2, and the port index starts from 0.

Case 1: if one of indexes of DMRS ports is greater than N1−1, then the total number of ports configured for the MU-MIMO transmission is greater than N1, and a second DMRS symbol must exist, i.e., the DMRS includes two OFDM symbols.

In the configuration table, when ports are allocated to MU-MIMO UEs, ports in a same DMRS group are allocated at first, and after the ports in the same DMRS group are allocated, ports belonging to different groups are allocated. In addition, the total number of configured MU-MIMO ports is greater than the number of ports included by any DMRS group. Therefore, at least the DMRS group indexes 0 and 1 are included in the configuration table instead of only the DMRS group index 0. That is, at least the DMRS groups with indexes 0 and 1 are allocated.

Case 2: if the number of configured ports is greater than 2 and the configured maximum port index is smaller than or equal to N1−1, then the total number of configured MU-MIMO ports is smaller than or equal to N1 and the DMRS includes one OFDM symbol.

According to the ports allocation principles mentioned the above, ports belonging to a same DMRS group are allocated first and at least the DMRS group indexes 0 and 1 are included in the configuration table instead of only the DMRS group index 0. That is, at least the DMRS groups with indexes 0 and 1 are allocated.

According to the principles and situations mentioned above, 75 different configurations are listed in the DMRS configuration table, for which 7-bit signaling is needed. One bit may be saved compared with the 8-bit signaling needed for indicating different information separately. Since not all the configurations involve with different combinations of DMRS group(s) or different DMRS symbol lengths, a part of the overhead can be reduced.

TABLE 4

| Configuration index | The number of layers | Port index | DMRS group index | DMRS symbol number |
|---|---|---|---|---|
| 0 | 1 | port 0 | group 0 | 1 |
| 1 | | | group 0/1 | |
| 2 | | | group 0/1/2 | |
| 3 | | | group 0 | 2 |
| 4 | | | group 0/1 | |
| 5 | | | group 0/1/2 | |
| 6 | 1 | port 1 | group 0 | 1 |
| 7 | | | group 0/1 | |
| 8 | | | group 0/1/2 | |
| 9 | | | group 0 | |
| 10 | | | group 0/1 | 2 |
| 11 | | | group 0/1/2 | |
| 12 | 1 | port 2 | group 0/1 | 1 |
| 13 | | | group 0/1/2 | |
| 14 | | | group 0/1 | 2 |
| 15 | | | group 0/1/2 | |
| 16 | 1 | port 3 | group 0/1 | 1 |
| 17 | | | group 0/1/2 | |
| 18 | | | group 0/1 | 2 |
| 19 | | | group 0/1/2 | |
| 20 | 1 | port 4 | group 0/1/2 | 1 |
| 21 | | | group 0/1/2 | 2 |
| 22 | 1 | port 5 | group 0/1/2 | 1 |
| 23 | | | group 0/1/2 | 2 |
| 24 | 1 | port 6 | group 0/1 | 2 |
| 25 | | | group 0/1/2 | |
| 26 | 1 | port 7 | group 0/1 | 2 |
| 27 | | | group 0/1/2 | |
| 28 | 1 | port 8 | group 0/1 | 2 |
| 29 | | | group 0/1/2 | |
| 30 | 1 | port 9 | group 0/1 | 2 |
| 31 | | | group 0/1/2 | |
| 32 | 1 | port 10 | group 0/1/2 | 2 |
| 33 | 1 | port 11 | group 0/1/2 | 2 |
| 34 | 2 | port 0-1 | group 0 | 1 |
| 35 | | | group 0/1 | |
| 36 | | | group 0/1/2 | |
| 37 | | | group 0 | 2 |
| 38 | | | group 0/1 | |
| 39 | | | group 0/1/2 | |

TABLE 4-continued

| Configuration index | The number of layers | Port index | DMRS group index | DMRS symbol number |
|---|---|---|---|---|
| 40 | 2 | port 2-3 | group 0/1 | 1 |
| 41 | | | group 0/1/2 | |
| 42 | | | group 0/1 | 2 |
| 43 | | | group 0/1/2 | |
| 44 | 2 | port 4-5 | group 0/1/2 | 1 |
| 45 | | | group 0/1/2 | 2 |
| 46 | 2 | port 6-7 | group 0/1 | 2 |
| 47 | | | group 0/1/2 | |
| 48 | 2 | port 8-9 | group 0/1 | 2 |
| 49 | | | group 0/1/2 | |
| 50 | 2 | port 10-11 | group 0/1/2 | 2 |
| 51 | 3 | port 0-2 | group 0/1 | 1 |
| 52 | | | group 0/1/2 | |
| 53 | 3 | port 3-5 | group 0/1/2 | 1 |
| 54 | 3 | port 0-1, 6 | group 0/1 | 2 |
| 55 | | | group 0/1/2 | |
| 56 | 3 | port 2-3, 8 | group 0/1 | 2 |
| 57 | | | group 0/1/2 | |
| 58 | 3 | port 4-5, 10 | group 0/1/2 | 2 |
| 59 | 4 | port 0-3 | group 0/1 | 1 |
| 60 | | | group 0/1/2 | |
| 61 | 4 | port 0-1, 6-7 | group 0/1 | 2 |
| 62 | | | group 0/1/2 | |
| 63 | 4 | port 2-3, 8-9 | group 0/1 | 2 |
| 64 | | | group 0/1/2 | |
| 65 | 4 | port 4-5, 10-11 | group 0/1/2 | 2 |
| 66 | 5 | port 0-4 | group 0/1/2 | 1 |
| 67 | 5 | port 0-2, 6-7 | group 0/1 | 2 |
| 68 | | | group 0/1/2 | |
| 69 | 6 | port 0-3, 6-7 | group 0/1 | 2 |
| 70 | | | group 0/1/2 | |
| 71 | 7 | port 0-3, 6-8 | group 0/1 | 2 |
| 72 | | | group 0/1/2 | |
| 73 | 8 | port 0-3, 6-9 | group 0/1 | 2 |
| 74 | | | group 0/1/2 | |

Scheme 2.

Numbering DMRS groups of different numbers of DMRS symbols together to indicate the DMRS groups and DMRS symbol numbers, as shown in table 5 below.

TABLE 5

| DMRS group index | Port index |
|---|---|
| 0 | port 0/1 |
| 1 | port 2/3 |
| 2 | port 4/5 |
| 3 | port 0/1/6/7 |
| 4 | port 2/3/8/9 |
| 5 | port 4/5/10/11 |

Table 6 below is a configuration table shown the DMRS group indexes in Table 5, where ports are allocated under the same principles as Scheme 1 but in a different form.

TABLE 6

| Configuration index | The number of layers | Port index | DMRS group index |
|---|---|---|---|
| 0 | 1 | port 0 | group 0 |
| 1 | | | group 0/1 |
| 2 | | | group 0/1/2 |
| 3 | | | group 3 |
| 4 | | | group 3/4 |
| 5 | | | group 3/4/5 |
| 6 | 1 | port 1 | group 0 |
| 7 | | | group 0/1 |
| 8 | | | group 0/1/2 |

TABLE 6-continued

| Configuration index | The number of layers | Port index | DMRS group index |
|---|---|---|---|
| 9 | | | group 3 |
| 10 | | | group 3/4 |
| 11 | | | group 3/4/5 |
| 12 | 1 | port 2 | group 0/1 |
| 13 | | | group 0/1/2 |
| 14 | | | group 3/4 |
| 15 | | | group 3/4/5 |
| 16 | 1 | port 3 | group 0/1 |
| 17 | | | group 0/1/2 |
| 18 | | | group 3/4 |
| 19 | | | group 3/4/5 |
| 20 | 1 | port 4 | group 0/1/2 |
| 21 | | | group 3/4/5 |
| 22 | 1 | port 5 | group 0/1/2 |
| 23 | | | group 3/4/5 |
| 24 | 1 | port 6 | group 3/4 |
| 25 | | | group 3/4/5 |
| 26 | 1 | port 7 | group 3/4 |
| 27 | | | group 3/4/5 |
| 28 | 1 | port 8 | group 3/4 |
| 29 | | | group 3/4/5 |
| 30 | 1 | port 9 | group 3/4 |
| 31 | | | group 3/4/5 |
| 32 | 1 | port 10 | group 3/4/5 |
| 33 | 1 | port 11 | group 3/4/5 |
| 34 | 2 | port 0-1 | group 0 |
| 35 | | | group 0/1 |
| 36 | | | group 0/1/2 |
| 37 | | | group 3 |
| 38 | | | group 3/4 |
| 39 | | | group 3/4/5 |
| 40 | 2 | port 2-3 | group 0/1 |
| 41 | | | group 0/1/2 |
| 42 | | | group 3/4 |
| 43 | | | group 3/4/5 |
| 44 | 2 | port 4-5 | group 0/1/2 |
| 45 | | | group 3/4/5 |
| 46 | 2 | port 6-7 | group 3/4 |
| 47 | | | group 3/4/5 |
| 48 | 2 | port 8-9 | group 3/4 |
| 49 | | | group 3/4/5 |
| 50 | 2 | port 10-11 | group 3/4/5 |
| 51 | 3 | port 0-2 | group 0/1 |
| 52 | | | group 0/1/2 |
| 53 | 3 | port 3-5 | group 0/1/2 |
| 54 | 3 | port 0-1, 6 | group 3/4 |
| 55 | | | group 3/4/5 |
| 56 | 3 | port 2-3, 8 | group 3/4 |
| 57 | | | group 3/4/5 |
| 58 | 3 | port 4-5, 10 | group 3/4/5 |
| 59 | 4 | port 0-3 | group 0/1 |
| 60 | | | group 0/1/2 |
| 61 | 4 | port 0-1, 6-7 | group 3/4 |
| 62 | | | group 3/4/5 |
| 63 | 4 | port 2-3, 8-9 | group 3/4 |
| 64 | | | group 3/4/5 |
| 65 | 4 | port 4-5, 10-11 | group 3/4/5 |
| 66 | 5 | port 0-4 | group 0/1/2 |
| 67 | 5 | port 0-2, 6-7 | group 3/4 |
| 68 | | | group 3/4/5 |
| 69 | 6 | port 0-3, 6-7 | group 3/4 |
| 70 | | | group 3/4/5 |
| 71 | 7 | port 0-3, 6-8 | group 3/4 |
| 72 | | | group 3/4/5 |
| 73 | 8 | port 0-3, 6-9 | group 3/4 |
| 74 | | | group 3/4/5 |

In addition, for pilot patterns illustrated by FIGS. 2 and 3, DMRS group indexes may be defined by Table 7.

TABLE 7

| DMRS group index | Port index (UE) | |
|---|---|---|
| | DMRS symbol number = 1 | DMRS symbol number = 2 |
| 0 | port 0/1 | port 0/1/4/5 |
| 1 | port 2/3 | port 2/3/6/7 |

For pilot patterns illustrated by FIGS. 4 and 5, DMRS group indexes may be defined by Table 8.

TABLE 8

| DMRS group index | Port index (UE) | |
|---|---|---|
| | DMRS symbol number = 1 | DMRS symbol number = 2 |
| 0 | port 0/1 | port 0/1/6/7 |
| 1 | port 2/3 | port 2/3/8/9 |
| 2 | port 4/5 | port 4/5/10/11 |

For pilot pattern illustrated by FIGS. 2 and 3 and PDSCH, the configuration table of DMRS may be set as Table 9.

TABLE 9

| DMRS configuration index | The number of layers (UE) | Port index (UE) | DMRS group index (UE) | DMRS symbol number |
|---|---|---|---|---|
| 0 | 1 | port 0 | group 0 | 1 |
| 1 | | | group 0/1 | |
| 2 | | | group 0 | 2 |
| 3 | | | group 0/1 | |
| 4 | 1 | port 1 | group 0 | 1 |
| 5 | | | group 0/1 | |
| 6 | | | group 0 | 2 |
| 7 | | | group 0/1 | |
| 8 | 1 | port 2 | group 0/1 | 1 |
| 9 | | | group 0/1 | 2 |
| 10 | 1 | port 3 | group 0/1 | 1 |
| 11 | | | group 0/1 | 2 |
| 12 | 1 | port 4 | group 0/1 | 2 |
| 13 | 1 | port 5 | group 0/1 | 2 |
| 14 | 1 | port 6 | group 0/1 | 2 |
| 15 | 1 | port 7 | group 0/1 | 2 |
| 16 | 2 | port 0-1 | group 0 | 1 |
| 17 | | | group 0/1 | |
| 18 | | | group 0 | 2 |
| 19 | | | group 0/1 | |
| 20 | 2 | port 2-3 | group 0/1 | 1 |
| 21 | | | group 0/1 | 2 |
| 22 | 2 | port 4-5 | group 0/1 | 2 |
| 23 | 2 | port 6-7 | group 0/1 | 2 |
| 24 | 3 | port 0-2 | group 0/1 | 1 |
| 25 | 3 | port 0-1, 4 | group 0/1 | 2 |
| 26 | 3 | port 2-3, 6 | group 0/1 | 2 |
| 27 | 4 | port 0-3 | group 0/1 | 1 |
| 28 | 4 | port 0-1, 4-5 | group 0/1 | 2 |
| 29 | 4 | port 2-3, 6-7 | group 0/1 | 2 |
| 30 | 5 | port 0-4 | group 0/1 | 2 |
| 31 | 6 | port 0-4, 6 | group 0/1 | 2 |
| 32 | 7 | port 0-6 | group 0/1 | 2 |
| 33 | 8 | port 0-7 | group 0/1 | 2 |

For pilot pattern illustrated by FIGS. 4 and 5, and PDSCH, the configuration table of DMRS may be set as Table 10.

TABLE 10

| DMRS configuration index | The number of layers (UE) | Port index (UE) | DMRS group index (UE) | DMRS symbol number |
|---|---|---|---|---|
| 0 | 1 | port 0 | group 0 | 1 |
| 1 | | | group 0/1 | |
| 2 | | | group 0/1/2 | |
| 3 | | | group 0 | 2 |
| 4 | | | group 0/1 | |
| 5 | | | group 0/1/2 | |
| 6 | 1 | port 1 | group 0 | 1 |
| 7 | | | group 0/1 | |
| 8 | | | group 0/1/2 | |
| 9 | | | group 0 | 2 |
| 10 | | | group 0/1 | |
| 11 | | | group 0/1/2 | |
| 12 | 1 | port 2 | group 0/1 | 1 |
| 13 | | | group 0/1/2 | |
| 14 | | | group 0/1 | 2 |
| 15 | | | group 0/1/2 | |
| 16 | 1 | port 3 | group 0/1 | 1 |
| 17 | | | group 0/1/2 | |
| 18 | | | group 0/1 | 2 |
| 19 | | | group 0/1/2 | |
| 20 | 1 | port 4 | group 0/1/2 | 1 |
| 21 | | | group 0/1/2 | 2 |
| 22 | 1 | port 5 | group 0/1/2 | 1 |
| 23 | | | group 0/1/2 | 2 |
| 24 | 1 | port 6 | group 0/1 | 2 |
| 25 | | | group 0/1/2 | |
| 26 | 1 | port 7 | group 0/1 | 2 |
| 27 | | | group 0/1/2 | |
| 28 | 1 | port 8 | group 0/1 | 2 |
| 29 | | | group 0/1/2 | |
| 30 | 1 | port 9 | group 0/1 | 2 |
| 31 | | | group 0/1/2 | |
| 32 | 1 | port 10 | group 0/1/2 | 2 |
| 33 | 1 | port 11 | group 0/1/2 | 2 |
| 34 | 2 | port 0-1 | group 0 | 1 |
| 35 | | | group 0/1 | |
| 36 | | | group 0/1/2 | |
| 37 | | | group 0 | 2 |
| 38 | | | group 0/1 | |
| 39 | | | group 0/1/2 | |
| 40 | 2 | port 2-3 | group 0/1 | 1 |
| 41 | | | group 0/1/2 | |
| 42 | | | group 0/1 | 2 |
| 43 | | | group 0/1/2 | |
| 44 | 2 | port 4-5 | group 0/1 | 1 |
| 45 | | | group 0/1/2 | 2 |
| 46 | 2 | port 6-7 | group 0/1 | 2 |
| 47 | | | group 0/1/2 | |
| 48 | 2 | port 8-9 | group 0/1 | 2 |
| 49 | | | group 0/1/2 | |
| 50 | 2 | port 10-11 | group 0/1/2 | 2 |
| 51 | 3 | port 0-2 | group 0/1 | 1 |
| 52 | | | group 0/1/2 | |
| 53 | 3 | port 3-5 | group 0/1/2 | 1 |
| 54 | 3 | port 0-1, 6 | group 0/1 | 2 |
| 55 | | | group 0/1/2 | |
| 56 | 3 | port 2-3, 8 | group 0/1 | 2 |
| 57 | | | group 0/1/2 | |
| 58 | 3 | port 4-5, 10 | group 0/1/2 | 2 |
| 59 | 4 | port 0-3 | group 0/1 | 1 |
| 60 | | | group 0/1/2 | |
| 61 | 4 | port 0-1, 6-7 | group 0/1 | 2 |
| 62 | | | group 0/1/2 | |
| 63 | 4 | port 2-3, 8-9 | group 0/1 | 2 |
| 64 | | | group 0/1/2 | |
| 65 | 4 | port 4-5, 10-11 | group 0/1/2 | 2 |
| 66 | 5 | port 0-4 | group 0/1 | 1 |
| 67 | 5 | port 0-2, 6-7 | group 0/1 | 2 |
| 68 | | | group 0/1/2 | |
| 69 | 6 | port 0-3, 6-7 | group 0/1 | 2 |
| 70 | | | group 0/1/2 | |
| 71 | 7 | port 0-3, 6-8 | group 0/1 | 2 |
| 72 | | | group 0/1/2 | |
| 73 | 8 | port 0-3, 6-9 | group 0/1 | 2 |
| 74 | | | group 0/1/2 | |

For the pilot patterns illustrated by FIGS. 2 and 3 and PUSCH, the configuration table of DMRS may be set as Table 11.

TABLE 11

| DMRS configuration index | The number of layers (UE) | Port index (UE) | DMRS group index (UE) | DMRS symbol number |
|---|---|---|---|---|
| 0 | 1 | port 0 | group | 1 |
| 1 | | | group 0/1 | |
| 2 | | | group 0 | 2 |
| 3 | | | group 0/1 | |
| 4 | 1 | port 1 | group 0 | 1 |
| 5 | | | group 0/1 | |
| 6 | | | group 0 | 2 |
| 7 | | | group 0/1 | |
| 8 | 1 | port 2 | group 0/1 | 1 |
| 9 | | | group 0/1 | 2 |
| 10 | 1 | port 3 | group 0/1 | 1 |
| 11 | | | group 0/1 | 2 |
| 12 | 1 | port 4 | group 0/1 | 2 |
| 13 | 1 | port 5 | group 0/1 | 2 |
| 14 | 1 | port 6 | group 0/1 | 2 |
| 15 | 1 | port 7 | group 0/1 | 2 |
| 16 | 2 | port 0-1 | group 0 | 1 |
| 17 | | | group 0/1 | |
| 18 | | | group 0 | 2 |
| 19 | | | group 0/1 | |
| 20 | 2 | port 2-3 | group 0/1 | 1 |
| 21 | | | group 0/1 | 2 |
| 22 | 2 | port 4-5 | group 0/1 | 2 |
| 23 | 2 | port 6-7 | group 0/1 | 2 |
| 24 | 3 | port 0-2 | group 0/1 | 1 |
| 25 | 3 | port 0-1, 4 | group 0/1 | 2 |
| 26 | 3 | port 2-3, 6 | group 0/1 | 2 |
| 27 | 4 | port 0-3 | group 0/1 | 1 |
| 28 | 4 | port 0-1, 4-5 | group 0/1 | 2 |
| 29 | 4 | port 2-3, 6-7 | group 0/1 | 2 |

For the pilot patterns illustrated by FIGS. 4 and 5 and PUSCH, the configuration table of DMRS may be set as Table 12.

TABLE 12

| DMRS configuration index | The number of layers (UE) | Port index (UE) | DMRS group index (UE) | DMRS symbol number |
|---|---|---|---|---|
| 0 | 1 | port 0 | group 0 | 1 |
| 1 | | | group 0/1 | |
| 2 | | | group 0/1/2 | |
| 3 | | | group 0 | 2 |
| 4 | | | group 0/1 | |
| 5 | | | group 0/1/2 | |
| 6 | 1 | port 1 | group 0 | 1 |
| 7 | | | group 0/1 | |
| 8 | | | group 0/1/2 | |
| 9 | | | group 0 | 2 |
| 10 | | | group 0/1 | |
| 11 | | | group 0/1/2 | |
| 12 | 1 | port 2 | group 0/1 | 1 |
| 13 | | | group 0/1/2 | |
| 14 | | | group 0/1 | 2 |
| 15 | | | group 0/1/2 | |
| 16 | 1 | port 3 | group 0/1 | 1 |
| 17 | | | group 0/1/2 | |
| 18 | | | group 0/1 | 2 |
| 19 | | | group 0/1/2 | |
| 20 | 1 | port 4 | group 0/1/2 | 1 |
| 21 | | | group 0/1/2 | 2 |
| 22 | 1 | port 5 | group 0/1/2 | 1 |
| 23 | | | group 0/1/2 | 2 |
| 24 | 1 | port 6 | group 0/1 | 2 |
| 25 | | | group 0/1/2 | |

TABLE 12-continued

| DMRS configuration index | The number of layers (UE) | Port index (UE) | DMRS group index (UE) | DMRS symbol number |
|---|---|---|---|---|
| 26 | 1 | port 7 | group 0/1 | 2 |
| 27 | | | group 0/1/2 | |
| 28 | 1 | port 8 | group 0/1 | 2 |
| 29 | | | group 0/1/2 | |
| 30 | 1 | port 9 | group 0/1 | 2 |
| 31 | | | group 0/1/2 | |
| 32 | 1 | port 10 | group 0/1/2 | 2 |
| 33 | 1 | port 11 | group 0/1/2 | 2 |
| 34 | 2 | port 0-1 | group 0 | 1 |
| 35 | | | group 0/1 | |
| 36 | | | group 0/1/2 | |
| 37 | | | group 0 | 2 |
| 38 | | | group 0/1 | |
| 39 | | | group 0/1/2 | |
| 40 | 2 | port 2-3 | group 0/1 | 1 |
| 41 | | | group 0/1/2 | |
| 42 | | | group 0/1 | 2 |
| 43 | | | group 0/1/2 | |
| 44 | 2 | port 4-5 | group 0/1/2 | 1 |
| 45 | | | group 0/1/2 | 2 |
| 46 | 2 | port 6-7 | group 0/1 | 2 |
| 47 | | | group 0/1/2 | |
| 48 | 2 | port 8-9 | group 0/1 | 2 |
| 49 | | | group 0/1/2 | |
| 50 | 2 | port 10-11 | group 0/1/2 | 2 |
| 51 | 3 | port 0-2 | group 0/1 | 1 |
| 52 | | | group 0/1/2 | |
| 53 | 3 | port 3-5 | group 0/1/2 | 1 |
| 54 | 3 | port 0-1, 6 | group 0/1 | 2 |
| 55 | | | group 0/1/2 | |
| 56 | 3 | port 2-3, 8 | group 0/1 | 2 |
| 57 | | | group 0/1/2 | |
| 58 | 3 | port 4-5, 10 | group 0/1/2 | 2 |
| 59 | 4 | port 0-3 | group 0/1 | 1 |
| 60 | | | group 0/1/2 | |
| 61 | 4 | port 0-1, 6-7 | group 0/1 | 2 |
| 62 | | | group 0/1/2 | |
| 63 | 4 | port 2-3, 8-9 | group 0/1 | 2 |
| 64 | | | group 0/1/2 | |
| 65 | 4 | port 4-5, 10-11 | group 0/1/2 | 2 |

For the pilot patterns illustrated by FIGS. 2 and 3, when PUSCH and single carrier waveform are adopted, the configuration table of DMRS may be set as Table 13.

TABLE 13

| DMRS configuration index | The number of layers (UE) | Port index (UE) | DMRS group index (UE) | DMRS symbol number |
|---|---|---|---|---|
| 0 | 1 | port 0 | group 0 | 1 |
| 1 | | | group 0/1 | |
| 2 | | | group 0 | 2 |
| 3 | | | group 0/1 | |
| 4 | 1 | port 1 | group 0 | 1 |
| 5 | | | group 0/1 | |
| 6 | | | group 0 | 2 |
| 7 | | | group 0/1 | |
| 8 | 1 | port 2 | group 0/1 | 1 |
| 9 | | | group 0/1 | 2 |
| 10 | 1 | port 3 | group 0/1 | 1 |
| 11 | | | group 0/1 | 2 |
| 12 | 1 | port 4 | group 0/1 | 2 |
| 13 | 1 | port 5 | group 0/1 | 2 |
| 14 | 1 | port 6 | group 0/1 | 2 |
| 15 | 1 | port 7 | group 0/1 | 2 |

If the DMRS group index, the DMRS symbol number and the port information are not to be put into a same configuration table, then the DMRS configuration tables may be as follows.

For the pilot patterns illustrated by FIGS. 2 and 3 and PDSCH, the configuration table of DMRS may be set as Table 14 in contrast to Table 9.

TABLE 14

| DMRS configuration index (single TRP) | The number of layers (UE) | Port index (UE) |
|---|---|---|
| 0 | 1 layer | port 0 |
| 1 | 1 layer | port 1 |
| 2 | 1 layer | port 2 |
| 3 | 1 layer | port 3 |
| 4 | 1 layer | port 4 |
| 5 | 1 layer | port 5 |
| 6 | 1 layer | port 6 |
| 7 | 1 layer | port 7 |
| 8 | 2 layers | port 0/1 |
| 9 | 2 layers | port 2/3 |
| 12 | 2 layers | port 4/5 |
| 13 | 2 layers | port 6/7 |
| 14 | 3 layers | port 0-2 |
| 15 | 3 layers | port 0-1, 4 |
| 16 | 3 layers | port 2-3, 6 |
| 17 | 4 layers | port 0-3 |
| 18 | 4 layers | port 0-1, 4-5 |
| 19 | 4 layers | port 2-3, 6-7 |
| 20 | 5 layers | port 0-4 |
| 21 | 6 layers | port 0-4, 6 |
| 22 | 7 layers | port 0-6 |
| 23 | 8 layers | port 0-7 |

For the pilot patterns illustrated by FIGS. 4 and 5, and PDSCH, the configuration table of DMRS may be set as Table 15 in contrast to Table 10.

TABLE 15

| DMRS configuration index (single TRP) | The number of layers (UE) | Port index (UE) |
|---|---|---|
| 0 | 1 layer | port 0 |
| 1 | 1 layer | port 1 |
| 2 | 1 layer | port 2 |
| 3 | 1 layer | port 3 |
| 4 | 1 layer | port 4 |
| 5 | 1 layer | port 5 |
| 6 | 1 layer | port 6 |
| 7 | 1 layer | port 7 |
| 8 | 1 layer | port 8 |
| 9 | 1 layer | port 9 |
| 10 | 1 layer | port 10 |
| 11 | 1 layer | port 11 |
| 12 | 2 layers | port 0-1 |
| 13 | 2 layers | port 2-3 |
| 14 | 2 layers | port 4-5 |
| 15 | 2 layers | port 6-7 |
| 16 | 2 layers | port 8-9 |
| 17 | 2 layers | port 10-11 |
| 18 | 3 layers | port 0-2 |
| 19 | 3 layers | port 3-5 |
| 20 | 3 layers | port 0-1, 6 |
| 21 | 3 layers | port 2-3, 8 |
| 22 | 3 layers | port 4-5, 10 |
| 23 | 4 layers | port 0-3 |
| 24 | 4 layers | port 0-1, 6-7 |
| 25 | 4 layers | port 2-3, 8-9 |
| 26 | 4 layers | port 4-5, 10-11 |
| 27 | 5 layers | port 0-4 |
| 28 | 6 layers | port 0-5 |
| 29 | 7 layers | port 0-6 |
| 30 | 8 layers | port 0-6, 8 |

For the pilot patterns illustrated by FIGS. 2 and 3, and PUSCH, the configuration table of the DMRS may be set as Table 16 in contrast to Table 11.

TABLE 16

| DMRS configuration index | The number of layers (UE) | Port index (UE) |
|---|---|---|
| 0 | 1 layer, | port 0 |
| 1 | 1 layer, | port 1 |
| 2 | 1 layer, | port 2 |
| 3 | 1 layer, | port 3 |
| 4 | 1 layer, | port 4 |
| 5 | 1 layer, | port 5 |
| 6 | 1 layer, | port 6 |
| 7 | 1 layer, | port 7 |
| 8 | 2 layers | port 0/1 |
| 9 | 2 layers | port 2/3 |
| 12 | 2 layers | port 4/5 |
| 13 | 2 layers | port 6/7 |
| 14 | 3 layers | port 0-2 |
| 15 | 3 layers | port 1-3 |
| 16 | 3 layers | port 0-1, 4 |
| 17 | 3 layers | port 2-3, 6 |
| 18 | 4 layers | port 0-3 |
| 19 | 4 layers | port 0-1, 4-5 |
| 20 | 4 layers | port 2-3, 6-7 |

For the pilot patterns illustrated by FIGS. 4 and 5, and PUSCH, the configuration table of DMRS may be set as Table 17 in contrast to Table 12.

TABLE 17

| DMRS configuration index | The number of layers (UE) | Port index (UE) |
|---|---|---|
| 0 | 1 layer | port 0 |
| 1 | 1 layer | port 1 |
| 2 | 1 layer | port 2 |
| 3 | 1 layer | port 3 |
| 4 | 1 layer | port 4 |
| 5 | 1 layer | port 5 |
| 6 | 1 layer | port 6 |
| 7 | 1 layer | port 7 |
| 8 | 1 layer | port 8 |
| 9 | 1 layer | port 9 |
| 10 | 1 layer | port 10 |
| 11 | 1 layer | port 11 |
| 12 | 2 layers | port 0-1 |
| 13 | 2 layers | port 2-3 |
| 14 | 2 layers | port 4-5 |
| 15 | 2 layers | port 6-7 |
| 16 | 2 layers | port 8-9 |
| 17 | 2 layers | port 10-11 |
| 18 | 3 layers | port 0-2 |
| 19 | 3 layers | port 3-5 |
| 20 | 3 layers | port 0-1, 6 |
| 21 | 3 layers | port 2-3, 8 |
| 22 | 3 layers | port 4-5, 10 |
| 23 | 4 layers | port 0-3 |
| 24 | 4 layers | port 0-1, 6-7 |
| 25 | 4 layers | port 2-3, 8-9 |
| 26 | 4 layers | port 4-5, 10-11 |

For the pilot patterns illustrated by FIGS. 2 and 3, when PUSCH and single carrier waveform are adopted, the configuration table of DMRS may be set as Table 18 in contrast to Table 13.

TABLE 18

| DMRS configuration index | The number of layers (UE) | Port index (UE) |
|---|---|---|
| 0 | 1 layer, | port 0 |
| 1 | 1 layer, | port 1 |
| 2 | 1 layer, | port 2 |
| 3 | 1 layer, | port 3 |
| 4 | 1 layer, | port 4 |
| 5 | 1 layer, | port 5 |
| 6 | 1 layer, | port 6 |
| 7 | 1 layer, | port 7 |

It can be seen that for the different situations mentioned above, the configuration tables illustrated by Tables 4, 6, 9, 10, 11, 12 and 13 may be used for the network device to indicate the DMRS ports allocated to the UEs, and for the UEs to determine DMRS ports to be occupied.

Based on the preset configuration tables above, the method and device for information indication, and the method and device for resource determination are introduced below.

Figure 6:
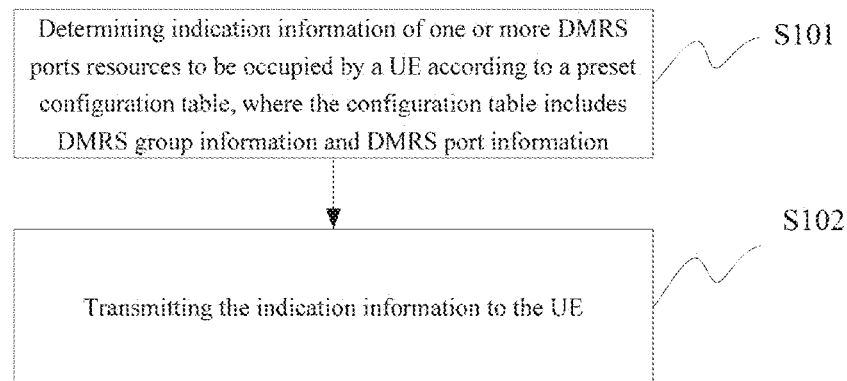
FIG. 6 is a flow chart of a method for information indication according to the embodiment of the disclosure.

As illustrated by FIG. 6, the method for information indication performed at a network side includes operations S101 and S102.

S101: determining indication information of one or more DMRS ports resources to be occupied by a UE according to a preset configuration table, where the configuration table includes DMRS group information and DMRS port information.

For example, the configuration table may be any one of the Tables 4, 6, 9, 10, 11, 12 and 13 according to different situations.

S102: transmitting the indication information to the UE.

With the method for information indication, the indication information of the one or more DMRS ports to be occupied by the UE is determined according to the preset configuration table, which includes the DMRS group information and the DMRS port information, and the indication information is transmitted to the UE. In one embodiment, an indication of the occupancy of DMRS ports resources can be achieved, and the terminal can determine the DMRS port resources that need to be occupied. Moreover, since the configuration table includes the DMRS group information and the DMRS port information, comparing with transmitting the DMRS group information and the DMRS port information separately, the method may reduce signaling overhead.

In one embodiment, the DMRS group information includes DMRS group indexes and quantities of DMRS symbols.

In one embodiment, the DMRS port information includes DMRS port indexes.

In one embodiment, the configuration table includes configuration indexes.

In one embodiment, the indication information includes the configuration indexes. For example, the UE and the network side device are pre-configured with the Tables 4, 6, 9, 10, 11, 12 and 13. The network side device may send a configuration index listed in the first column of one of the tables to the UE so that the UE may determine one of the DMRS port indexes corresponding to the configuration index by looking up in the table.

In one embodiment, the configuration table includes quantities of DMRS configuration layers.

In one embodiment, a DMRS ports designation principle of the configuration table includes: when designating the one or more DMRS ports resources to the UE, setting indexes of respective DMRS ports and respective DMRS groups, respectively, to numbers starting from 0 in an order from least to greatest, and if an index of a DMRS group including a DMRS port to be occupied by the UE is greater than 0, then determining that any DMRS group having an index smaller than the index of the DMRS group including the DMRS port designated to the UE is to be occupied by the UE.

In one embodiment, if a DMRS includes an OFDM symbol, the maximum number of supported port(s) is N1 (e.g., N1 equals to 6 for the pilot pattern illustrated by FIG. 4), and when a DMRS includes 2 OFDM symbols, the maximum number of supported ports is N2 (e.g., N2 equals to 12 for the pilot pattern illustrated by FIG. 5), and the indexes of each DMRS port and each DMRS group are set to numbers starting from 0 in the order from the least to the greatest, respectively, then the configuration list includes one or a combination of the following cases.

Case 1: if one index of indexes of DMRS ports to be occupied by the different UEs is greater than N1−1, then the total number of DMRS ports configured for the MU-MIMO transmission is greater than N1, and a DMRS includes 2 OFDM symbols. According to the DMRS ports designation principle, DMRS ports belonging to a same DMRS group are designated first, where the indexes of the DMRS groups include at least 0 and 1.

Case 2: if the number of the DMRS ports designated to the different UEs is greater than 2 and none of the indexes of the designated DMRS ports is greater than N1−1, then the total number of configured MU-MIMO DMRS ports is smaller than or equal to N1 and the DMRS includes only one OFDM symbol. According to the DMRS ports designation principle, DMRS ports belonging to a same DMRS group are designated first, where the indexes of the DMRS groups include at least 0 and 1.

In one embodiment, the configuration table includes five columns of contents, such as the Table 4, where the first column indicates DMRS configuration indexes, the second column indicates the quantities of DMRS configuration layers of the UE under the configurations corresponding to the DMRS configuration indexes, the third column indicates the DMRS port indexes corresponding to the quantities of DMRS configuration layers of the UEs, the fourth column indicates the DMRS group indexes of DMRS groups including the DMRS ports of all the UEs in a MU-MIMO system, and the fifth column indicates the number of allocated DMRS symbols.

In one embodiment, the configuration table includes four columns, such as the Table 6, where the first column indicates DMRS configuration indexes, the second column indicates the quantities of DMRS configuration layers of the UE under the configurations corresponding to the DMRS configuration indexes, the third column indicates the DMRS port indexes corresponding to the quantities of DMRS configuration layers of the UE, and the fourth column indicates the DMRS group indexes of DMRS groups including the DMRS ports of all the UEs in a MU-MIMO system, and different DMRS group indexes correspond to different numbers of DMRS symbols.

In one embodiment, the method further includes: transmitting indication information of a DMRS pilot pattern corresponding to the preset configuration table to the UE. For example, when there are pilot patterns illustrated by FIGS. 2-5, the network side device may in advance inform the UE of the pilot pattern the configuration table corresponding to which is to be used.

Figure 7:
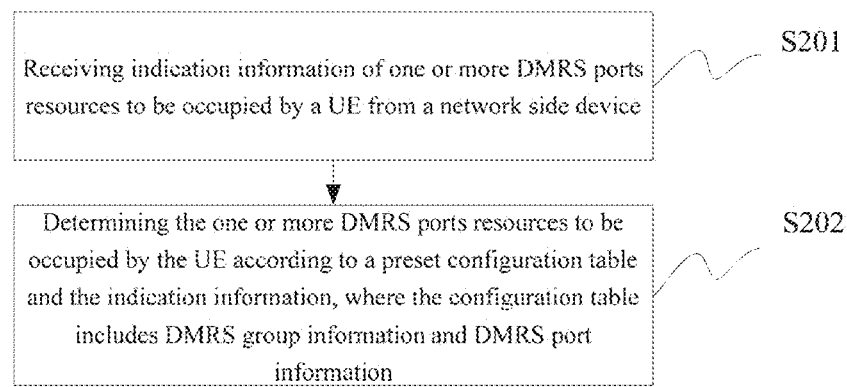
FIG. 7 is a flow chart of a method for resource determination according to the embodiment of the disclosure.

Accordingly, as illustrated by FIG. 7, a method for resource determination performed at the UE's side according to the embodiment of the disclosure includes operations S201 and S202.

S201: receiving indication information of one or more DMRS ports resources to be occupied by a UE from a network side device.

S202: determining the one or more DMRS ports resources to be occupied by the UE according to a preset configuration table and the indication information, where the configuration table includes DMRS group information and DMRS port information.

In one embodiment, the method further includes: receiving indication information of a DMRS pilot pattern; and determining the preset configuration table corresponding to the indication information of the DMRS pilot pattern.

For example, in the case of pilot patterns illustrated by FIGS. 2-5, the indication information of the DMRS pilot pattern transmitted by the network side device indicates that the pilot pattern illustrated by FIG. 5 is to be used, then the UE shall select the configuration table corresponding to the pilot pattern illustrated by FIG. 5, e.g., the Table 4. By using the Table 4 and the configuration index notified of by the network side device, the UE looks the DMRS port(s) corresponding to the configuration index up in the Table 4 to determine the DMRS port(s) to be occupied by the UE.

Figure 8:
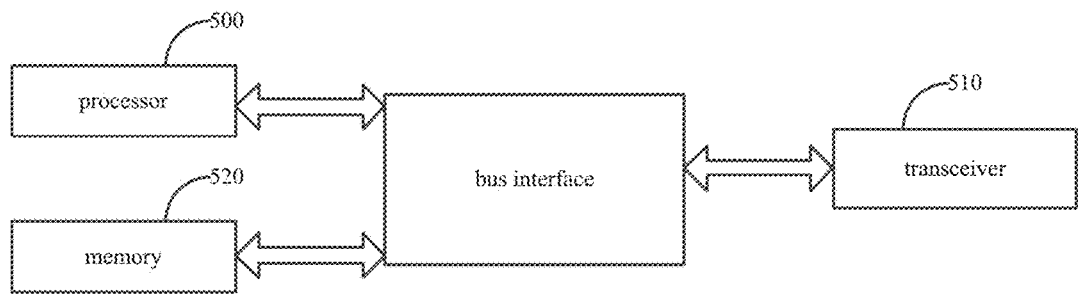
FIG. 8 is a schematic diagram of a structure of a device for information indication according to the embodiment of the disclosure.

As illustrated by FIG. 8, a device for information indication according to the embodiment of the disclosure includes a memory 520, a processor 500 and a transceiver 510.

The memory 520 is configured to store program instructions.

The processor 500 is configured to read the program instructions to perform operations of: determining indication information of one or more DMRS ports resources to be occupied by a UE according to a preset configuration table, where the configuration table includes DMRS group information and DMRS port information; and transmitting the indication information to the UE via the transceiver 510.

In one embodiment, the DMRS group information includes DMRS group indexes and the number of DMRS symbols.

In one embodiment, the DMRS port information includes DMRS port indexes.

In one embodiment, the configuration table further includes configuration indexes.

In one embodiment, the indication information includes the configuration indexes.

In one embodiment, the configuration table further includes quantities of DMRS configuration layers.

In one embodiment, a DMRS ports designation principle of the configuration table includes: when designating the one or more DMRS ports resources to the UE, setting indexes of respective DMRS ports and respective DMRS groups, respectively, to numbers starting from 0 in an order from least to greatest, and when an index of a DMRS group including one of the one or more DMRS ports to be occupied by the UE is greater than 0, then determining that any DMRS group having an index smaller than the index of the DMRS group including the DMRS port designated to the UE is to be occupied by a UE.

In one embodiment, when a DMRS includes one OFDM symbol, the maximum number of supported ports is N1, when a DMRS includes two OFDM symbols, the maximum number of supported ports is N2, and the indexes of the respective DMRS ports and the respective DMRS groups are set to the numbers starting from 0 in the order from the least to the greatest, respectively, then the configuration table includes one or a combination of following cases.

Case 1: when one index of indexes of DMRS ports designated to the UE is greater than N1−1, then the total number of DMRS ports configured for the MU-MIMO transmission is greater than N1, and a DMRS includes 2 OFDM symbols; and according to the DMRS ports designation principle, DMRS ports belonging to a same DMRS group are designated first, where DMRS group indexes of the DMRS group include at least 0 and 1.

Case 2: when the number of the DMRS ports designated to the UE is greater than 2 and no index of the designated DMRS ports is greater than N1−1, then the total number of DMRS ports configured for the MU-MIMO transmission is smaller than or equal to N1 and the DMRS includes one OFDM symbol; and according to the DMRS ports designation principle, DMRS ports belonging to a same DMRS group are designated first, where DMRS groups indexes of the DMRS group includes at least 0 and 1.

In one embodiment, the configuration table includes five columns, where a first column indicates DMRS configuration indexes, a second column indicates quantities of DMRS configuration layers of the UE under configurations corresponding to the DMRS configuration indexes, a third column indicates DMRS port indexes corresponding to the quantities of DMRS configuration layers of the UE, a fourth column indicates DMRS group indexes of DMRS groups including DMRS ports of all UEs in a MU-MIMO system, and a fifth column indicates the number of allocated DMRS symbols.

In one embodiment, the configuration table includes four columns, where a first column indicates DMRS configuration indexes, a second column indicates quantities of DMRS configuration layers of the UE under configurations corresponding to the DMRS configuration indexes, a third column indicates DMRS port indexes corresponding to the quantities of DMRS configuration layers of the UE, a fourth column indicates DMRS group indexes of DMRS groups including DMRS ports of all UEs in a MU-MIMO system, and different DMRS group indexes correspond to different numbers of DMRS symbols.

In one embodiment, the processor is further configured to read the program instructions to perform an operation of: transmitting indication information of a DMRS pilot pattern corresponding to the preset configuration table to the UE via the transceiver 510.

The transceiver 510 is configured to transmit and receive data under the control of the processor 500.

The bus architecture illustrated by FIG. 8 may include any number of interconnected buses and bridges, linking together various circuits of one or more processors represented by the processor 500 and one or more memories represented by the memory 520. The bus architecture may also link various other circuits such as peripherals, voltage regulators, and power management circuits, which are well known in the art, so they are not described further herein. The bus interfaces provide interfaces. The transceiver 510 may be multiple elements, including a transmitter and a transceiver, providing a device for communicating with various other devices over a transmission medium. The processor 500 is responsible for managing the bus architecture and general processing, and the memory 520 may store data used by the processor 500 when performing operations.

The processor 500 may be a central processing device (hereinafter "CPU"), an application specific integrated circuit (hereinafter "ASIC"), a field-programmable gate array (hereinafter "FPGA"), or a complex programmable logic device (hereinafter "CPLD").

Figure 9:
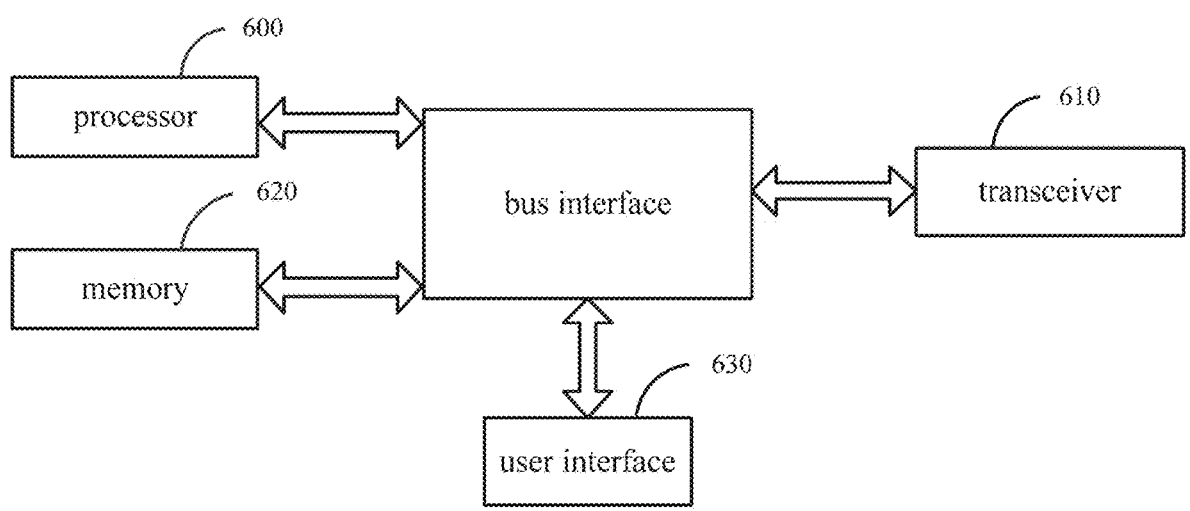
FIG. 9 is a schematic diagram of a structure of a device for resource determination according to the embodiment of the disclosure.

As illustrated by FIG. 9, a device for resource determination at the UE side according to the embodiment of the disclosure includes a memory 620, a processor 600 and a transceiver 610.

The memory 620 is configured to store program instructions.

The processor 600 is configured to read the program instructions to perform operations of: receiving, via the transceiver 610, indication information of one or more DMRS ports resources to be occupied by a UE from a network side device; and determining the one or more DMRS ports resources to be occupied by the UE according to a preset configuration table and the indication information, where the configuration table includes DMRS group information and DMRS port information.

In one embodiment, the processor is further configured to read the program instructions to perform an operation of: receiving indication information of a DMRS pilot pattern; and determining the preset configuration table corresponding to the indication information of the DMRS pilot pattern.

The transceiver 610 is configured to transmit and receive data under the control of the processor 600.

The bus architecture illustrated by FIG. 9 may include any number of interconnected buses and bridges, linking together various circuits of one or more processors represented by the processor 600 and one or more memories represented by the memory 620. The bus architecture may also link various other circuits such as peripherals, voltage regulators, and power management circuits, which are well known in the art, so they are not described further herein. The bus interfaces provide interfaces. The transceiver 610 may be multiple elements, including a transmitter and a transceiver, providing a device for communicating with various other devices over a transmission medium. For different UEs, the user interface 630 may also be an interface capable of connecting a device externally or internally, and the connected device includes but is not limited to a keypad, a display, a speaker, a microphone or a joystick.

The processor 600 is responsible for managing the bus architecture and general processing, and the memory 620 may store data used by the processor 600 when performing operations.

The processor 600 may be a CPU, an ASIC, an FPGA, or a CPLD.

Figure 10:
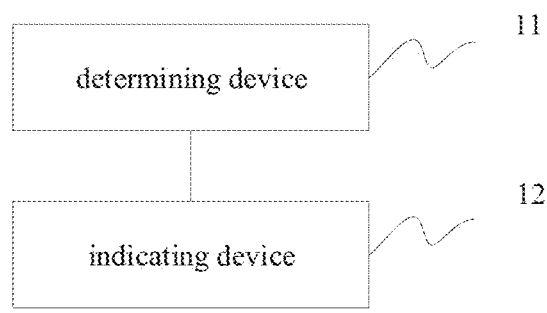
FIG. 10 is a schematic diagram of a structure of another device for information indication according to the embodiment of the disclosure.
Figure 11:
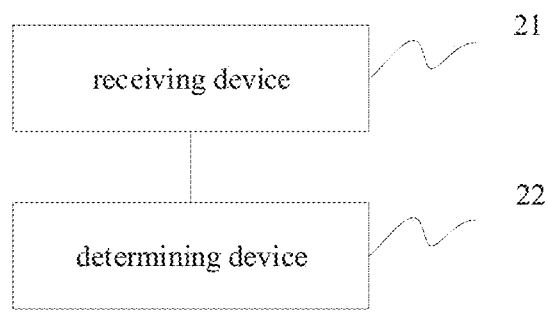
FIG. 11 is a schematic diagram of a structure of another device for resource determination according to the embodiment of the disclosure.

As illustrated by FIG. 10, another device for information indication according to the embodiment of the disclosure includes a determining device 11 and an indicating device 12.

The determining device 11 is configured to determine indication information of one or more DMRS ports resources to be occupied by a UE according to a preset configuration table. The configuration table includes DMRS group information and DMRS port information.

The indicating device 12 is configured to transmit the indication information to the UE.

As illustrated by FIG. 10, another device for resource determination according to the embodiment of the disclosure includes a receiving device 21 and a determining device 22.

The receiving device 21 is configured to receive indication information of one or more DMRS ports resources to be occupied by a UE from a network side device.

The determining device 22 is configured to determine the one or more DMRS ports resources to be occupied by the UE according to a preset configuration table and the indication information, where the configuration table includes DMRS group information and DMRS port information.

The embodiment of the disclosure may transmit indication information of port numbers by using a few bits in the NR system.

The embodiment of the disclosure further provides a computer storage medium configured to store computer instructions executable to the computing devices above. The computer instructions include programs of the method for information indication or the method for resource determination.

The computer storage medium may be any available medium or data storage device that can be accessed by a computer, including but not limited to magnetic storage (such as a floppy disk, hard disk, magnetic tape, or magneto-optical (hereinafter "MO") disk), optical storage (such as a compact disc (hereinafter "CD"), digital versatile disc (hereinafter "DVD"), blue-ray disk (hereinafter "BD"), or holographic versatile disc (hereinafter "HVD")), and semiconductor memory (such as a read-only memory (hereinafter "ROM"), erasable programmable read-only memory (hereinafter "EPROM"), electrically erasable programmable read-only memory (hereinafter "EEPROM"), non-volatile storage, NAND flash, or solid-state hard drive (hereinafter "SSD")).

The methods according to the embodiment of the disclosure may be applied to a UE or to a network side device.

It shall be further appreciated that according to the embodiments of the disclosure, the UE includes but is not be limited to an MS, a mobile terminal, a mobile telephone, a handset, portable equipment, and etc. The user equipment can communicate with one or more core networks via an RAN. For example, the user equipment can be a mobile phone (or a cell phone) or a computer having a function of radio communication, or the user equipment can be a portable, pocket, handheld, built-in-computer, or on-vehicle mobile apparatus.

According to the embodiments of the disclosure, the network side device may be a base station (e.g., an access point), and refers to be an apparatus in an access network that communicates with a radio terminal over one or more sectors via an air interface. The base station can be configured to convert a received air frame into an IP packet and a received IP packet into an air frame, and operate as a router between the radio terminal and the remaining components of the access network, where the remaining components of the access network can include an IP network. The base station can further coordinate attribute management of the air interface. For example, the base station can be a BTS in a GSM or CDMA system, a Node B in a TD-SCDMA or a WCDMA system, or an evolutional Node B (or referred to as eNodeB, eNB or e-Node B) in an LTE system, although the disclosure is not limited thereto.

Embodiments of the disclosure can be embodied as a method, a system or a computer program product. Therefore, the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a magnetic storage and an optical storage) in which computer useable program codes are contained.

Embodiment of the disclosure can be embodied as a method, a system or a computer program product. Therefore, the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the apparatus (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing apparatus to produce a machine so that the instructions executed on the computer or the processor of the other programmable data processing apparatus create means for performing the functions specified in the flow(s) of the flow chart and/or the block(s) of the block diagram.

These computer program instructions can also be stored into a computer readable memory capable of directing the computer or the other programmable data processing apparatus to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing apparatus so that a series of operational operations are performed on the computer or the other programmable data processing apparatus to create a computer implemented process so that the instructions executed on the computer or the other programmable apparatus provide operations for performing the functions specified in the flow(s) of the flow chart and/or the block(s) of the block diagram.

The invention claimed is:

1. A method for information indication, comprising:
 determining indication information of one or more demodulation reference signal (DMRS) ports resources to be occupied by a terminal according to a preset configuration table, wherein the configuration table comprises DMRS group information and DMRS port information; and
 transmitting the indication information to the terminal;
 wherein a DMRS ports designation principle of the configuration table comprises:
 when designating one or more DMRS ports resources to the terminal, setting indexes of respective DMRS ports and respective DMRS groups, respectively, to numbers starting from 0 in an order from least to greatest, and when an index of a DMRS group including one of the one or more DMRS ports to be occupied by the terminal is greater than 0, then defaulting that any DMRS group having an index smaller than the index of the DMRS group including the DMRS port designated to the terminal is to be occupied by the terminal;
 wherein when a DMRS comprises one orthogonal frequency division multiplexing (OFDM) symbol, the maximum number of supported ports is N1, when a DMRS comprises two OFDM symbols, the maximum number of supported ports is N2, and the indexes of the respective DMRS ports and the respective DMRS groups are set to the numbers starting from 0 in the order from the least to the greatest, respectively, then the configuration table comprises one or a combination of following cases:

case 1: when one index of indexes of DMRS ports designated to the terminal is greater than N1−1, then the total number of DMRS ports configured for multi-user multiple-input multiple output (MU-MIMO) transmission is greater than N1, and a DMRS comprises two OFDM symbols;

case 2: when the number of the DMRS ports designated to the terminal is greater than two and no index of the designated DMRS ports is greater than N1−1, then the total number of DMRS ports configured for the MU-MIMO transmission is smaller than or equal to N1 and the DMRS comprises one OFDM symbol.

2. The method according to claim 1, wherein the DMRS group information comprises DMRS group indexes and the number of DMRS symbols; and/or the DMRS port information comprises DMRS port indexes.

3. The method according to claim 1, wherein the configuration table further comprises configuration indexes, and/or quantities of DMRS configuration layers.

4. The method according to claim 3, wherein the indication information comprises the configuration indexes.

5. The method according to claim 1, wherein
according to the DMRS ports designation principle, DMRS ports belonging to a same DMRS group are designated first, wherein DMRS group indexes of the DMRS group comprise at least a DMRS group index 0 and a DMRS group index 1.

6. The method according to claim 1, wherein the configuration table comprises five columns, wherein a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and a fifth column indicates the number of allocated DMRS symbols; or
the configuration table comprises four columns, wherein a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and different DMRS group indexes correspond to different numbers of DMRS symbols.

7. The method according to claim 1, further comprising: transmitting indication information of a DMRS pilot pattern corresponding to the preset configuration table to the terminal.

8. A method for resource determination, comprising:
receiving indication information of one or more demodulation reference signal (DMRS) ports resources to be occupied by a terminal from a network side device; and
determining the one or more DMRS ports resources to be occupied by the terminal according to a preset configuration table and the indication information, wherein the configuration table comprises DMRS group information and DMRS port information;
wherein a DMRS ports designation principle of the configuration table comprises:
when designating one or more DMRS ports resources to the terminal, setting indexes of respective DMRS ports and respective DMRS groups, respectively, to numbers starting from 0 in an order from least to greatest, and when an index of a DMRS group including one of the one or more DMRS ports to be occupied by the terminal is greater than 0, then defaulting that any DMRS group having an index smaller than the index of the DMRS group including the DMRS port designated to the terminal is to be occupied by the terminal;
wherein when a DMRS comprises one orthogonal frequency division multiplexing (OFDM) symbol, the maximum number of supported ports is N1, when a DMRS comprises two OFDM symbols, the maximum number of supported ports is N2, and the indexes of the respective DMRS ports and the respective DMRS groups are set to the numbers starting from 0 in the order from the least to the greatest, respectively, then the configuration table comprises one or a combination of following cases:

case 1: when one index of indexes of DMRS ports designated to the terminal is greater than N1−1, then the total number of DMRS ports configured for multi-user multiple-input multiple output (MU-MIMO) transmission is greater than N1, and a DMRS comprises two OFDM symbols;

case 2: when the number of the DMRS ports designated to the terminal is greater than two and no index of the designated DMRS ports is greater than N1−1, then the total number of DMRS ports configured for the MU-MIMO transmission is smaller than or equal to N1 and the DMRS comprises one OFDM symbol.

9. The method according to claim 8, further comprising:
receiving indication information of a DMRS pilot pattern; and
determining the preset configuration table corresponding to the indication information of the DMRS pilot pattern.

10. A device for information indication, comprising:
a memory configured to store program instructions; and
a processor configured to read the program instructions to perform operations of:
determining indication information of one or more demodulation reference signal (DMRS) ports resources to be occupied by a terminal according to a preset configuration table, wherein the configuration table comprises DMRS group information and DMRS port information; and
transmitting the indication information to the terminal;
wherein a DMRS ports designation principle of the configuration table comprises:
when designating one or more DMRS ports resources to the terminal, setting indexes of respective DMRS ports and respective DMRS groups, respectively, to numbers starting from 0 in an order from least to greatest, and when an index of a DMRS group including one of the one or more DMRS ports to be occupied by the terminal is greater than 0, then defaulting that any DMRS group having an index smaller than the index of the DMRS group including the DMRS port designated to the terminal is to be occupied by the terminal;
wherein when a DMRS comprises one orthogonal frequency division multiplexing (OFDM) symbol, the maximum number of supported ports is N1, when a DMRS comprises two OFDM symbols, the maximum number of supported ports is N2, and the indexes of the respective DMRS ports and the respective DMRS groups are set to the numbers starting from 0 in the order from the least to the greatest, respectively, then the configuration table comprises one or a combination of following cases:

case 1: when one index of indexes of DMRS ports designated to the terminal is greater than N1−1, then the total number of DMRS ports configured for multi-user multiple-input multiple output (MU-MIMO) transmission is greater than N1, and a DMRS comprises two OFDM symbols;

case 2: when the number of the DMRS ports designated to the terminal is greater than two and no index of the designated DMRS ports is greater than N1−1, then the total number of DMRS ports configured for the MU-MIMO transmission is smaller than or equal to N1 and the DMRS comprises one OFDM symbol.

11. The device according to claim 10, wherein the DMRS group information comprises DMRS group indexes and the number of DMRS symbols; and/or the DMRS port information comprises DMRS port indexes.

12. The device according to claim 10, wherein the configuration table further comprises configuration indexes, and/or quantities of DMRS configuration layers.

13. The device according to claim 12, wherein the indication information comprises the configuration indexes.

14. The device according to claim 10, wherein
according to the DMRS ports designation principle, DMRS ports belonging to a same DMRS group are designated first, wherein DMRS group indexes of the DMRS group comprise at least a DMRS group index 0 and a DMRS group index 1.

15. The device according to claim 10, wherein the configuration table comprises five columns, wherein a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and a fifth column indicates the number of allocated DMRS symbols; or the configuration table comprises four columns, wherein a first column indicates DMRS configuration indexes, a second column indicates quantities of DMRS configuration layers of the terminal under configurations corresponding to the DMRS configuration indexes, a third column indicates DMRS port indexes corresponding to the quantities of DMRS configuration layers of the terminal, a fourth column indicates DMRS group indexes of DMRS groups including DMRS ports of all terminals in a MU-MIMO system, and different DMRS group indexes correspond to different numbers of DMRS symbols.

16. The device according to claim 10, wherein the processor is further configured to read the program instructions to perform an operation of:
transmitting indication information of a DMRS pilot pattern corresponding to the preset configuration table to the terminal.

17. A device for resource determination, comprising:
a memory configured to store program instructions; and
a processor configured to read the program instructions to perform the method of claim 8.

18. The device according to claim 17, wherein the processor is further configured to read the program instructions to perform an operation of:
receiving indication information of a DMRS pilot pattern; and
determining the preset configuration table corresponding to the indication information of the DMRS pilot pattern.

* * * * *